(12) United States Patent
Yuta

(10) Patent No.: US 8,255,342 B2
(45) Date of Patent: Aug. 28, 2012

(54) METHOD, APPARATUS, AND PROGRAM FOR GENERATING PREDICTION MODEL BASED ON MULTIPLE REGRESSION ANALYSIS

(75) Inventor: Kohtarou Yuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/585,512

(22) Filed: Sep. 16, 2009

(65) Prior Publication Data

US 2010/0070441 A1 Mar. 18, 2010

Related U.S. Application Data

(63) Continuation of application No. PCT/JP2007/056478, filed on Mar. 27, 2007.

(51) Int. Cl.
*G06F 15/18* (2006.01)
(52) U.S. Cl. ......................................................... 706/12
(58) Field of Classification Search ..................... 706/12
See application file for complete search history.

(56) References Cited

U.S. PATENT DOCUMENTS

| | | | | |
|---|---|---|---|---|
| 6,778,960 | B2 * | 8/2004 | Fukada | 704/260 |
| 7,089,186 | B2 * | 8/2006 | Fukada | 704/258 |
| 7,725,413 | B2 * | 5/2010 | Yuta | 706/20 |

FOREIGN PATENT DOCUMENTS

| | | |
|---|---|---|
| JP | 2004-157814 | 6/2004 |
| JP | 2006-330988 | 12/2006 |

OTHER PUBLICATIONS

Patent Abstracts of Japan, Publication No. 2006-330988, Published Dec. 7, 2006.
Patent Abstracts of Japan, Publication No. 2004-157814, Published Jun. 3, 2004.
Tomohisa Nagamatsu, et al., "Antitumor activity molecular design of flavin and 5-deazaflavin analogs and auto dock study of PTK inhibitors", Nov. 29, 2006, Proceeding of the $25^{th}$ Medicinal Chemistry Symposium, 1p-20, pp. 82-83.
Akiko Baba et al., "Structure-activity Relationships for the electrophilic reactivites of 1-b-o-Acyl glucuronides," Proceedings of the $34^{th}$ Structure-Activity Relationships Symposium, KP20, pp. 123-126.
Bin Zhang "Regression Clustering" Proceedings of the Third IEEE International Conference on Data Mining, 8pp. Apr. 3, 1978.
Bin Zhang, "Regression Clustering," Proceedings of the Third IEEE International Conference on Data Mining, Nov. 19, 2003, p. 451-458.
International Search Report for PCT/JP2007/056478, mailed May 22, 2007.

* cited by examiner

Primary Examiner — Michael B Holmes
(74) Attorney, Agent, or Firm — Staas & Halsey LLP

(57) ABSTRACT

An objective variable prediction model based on multiple regression analysis and having high prediction accuracy is generated by a computer. The method includes the steps of: a) constructing an initial sample set from samples whose measured value of an objective variable is known; b) obtaining a calculated value of the objective variable using multiple regression analysis; c) extracting samples whose difference between the measured and the calculated value is not larger than a first value, and calculating a determination coefficient by applying multiple regression analysis to the extracted samples; d) repeating the step c) by changing the first value until the determination coefficient exceeds a second value; and e) performing two-class classification to classify the sub-sample set obtained at the end of the step d) as a first sub-sample set and remaining samples as a second sub-sample set, and calculating a discriminant function.

16 Claims, 18 Drawing Sheets

Fig. 7

| SAMPLE ID | OBJECTIVE VARIABLE | PARAMETERS (EXPLANATORY VARIABLES) | | | | | | | |
|---|---|---|---|---|---|---|---|---|---|
| | IC50/μM | NUMBER OF ATOMS (x1) | NUMBER OF CARBON ATOMS (x2) | NUMBER OF OXYGEN ATOMS (x3) | NUMBER OF NITROGEN ATOMS (x4) | NUMBER OF SULFUR ATOMS (x5) | NUMBER OF FLUORINE ATOMS (x6) | NUMBER OF CHLORINE ATOMS (x7) | NUMBER OF BROMINE ATOMS (x8) |
| 1 | 1 | 44 | 33 | 9 | 2 | 0 | 0 | 0 | 0 |
| 2 | 2.3 | 20 | 16 | 4 | 0 | 0 | 0 | 0 | 0 |
| 3 | 3.2 | 21 | 15 | 6 | 0 | 0 | 0 | 0 | 0 |
| 4 | 0.73 | 18 | 13 | 5 | 0 | 0 | 0 | 0 | 0 |
| 5 | 0.44 | 10 | 6 | 4 | 0 | 0 | 0 | 0 | 0 |
| 6 | 0.43 | 4 | 1 | 0 | 0 | 0 | 0 | 1 | 0 |
| 7 | 20 | 16 | 12 | 4 | 0 | 0 | 2 | 0 | 0 |
| 8 | 1.1 | 7 | 4 | 3 | 1 | 0 | 0 | 0 | 0 |
| 9 | 3.8 | 7 | 4 | 2 | 0 | 0 | 0 | 0 | 0 |
| 10 | 0.97 | 7 | 2 | 2 | 1 | 0 | 0 | 3 | 0 |
| 779 | 0.005 | 13 | 10 | 2 | 2 | 0 | 0 | 0 | 0 |

Fig.8

| NUMBER OF ATOMS (a1) | NUMBER OF CARBON ATOMS (a2) | NUMBER OF OXYGEN ATOMS (a3) | NUMBER OF NITROGEN ATOMS (a4) | ... | NUMBER OF IODINE ATOMS (a28) | CONSTANT C |
|---|---|---|---|---|---|---|
| 40.171848 | 33.574188 | -25.081661 | 13.88335 | | -4.03751 | 165.669998 |

| NUMBER OF SAMPLES | NUMBER OF PARAMETERS | RELIABILITY METRIC | R2 VALUE (%) | R VALUE (%) | F-TEST VALUE | CROSS VALIDATION (%) |
|---|---|---|---|---|---|---|
| 779 | 28 | 27.8 | 72.8 | 85.3 | 7.17 | 69.6 |

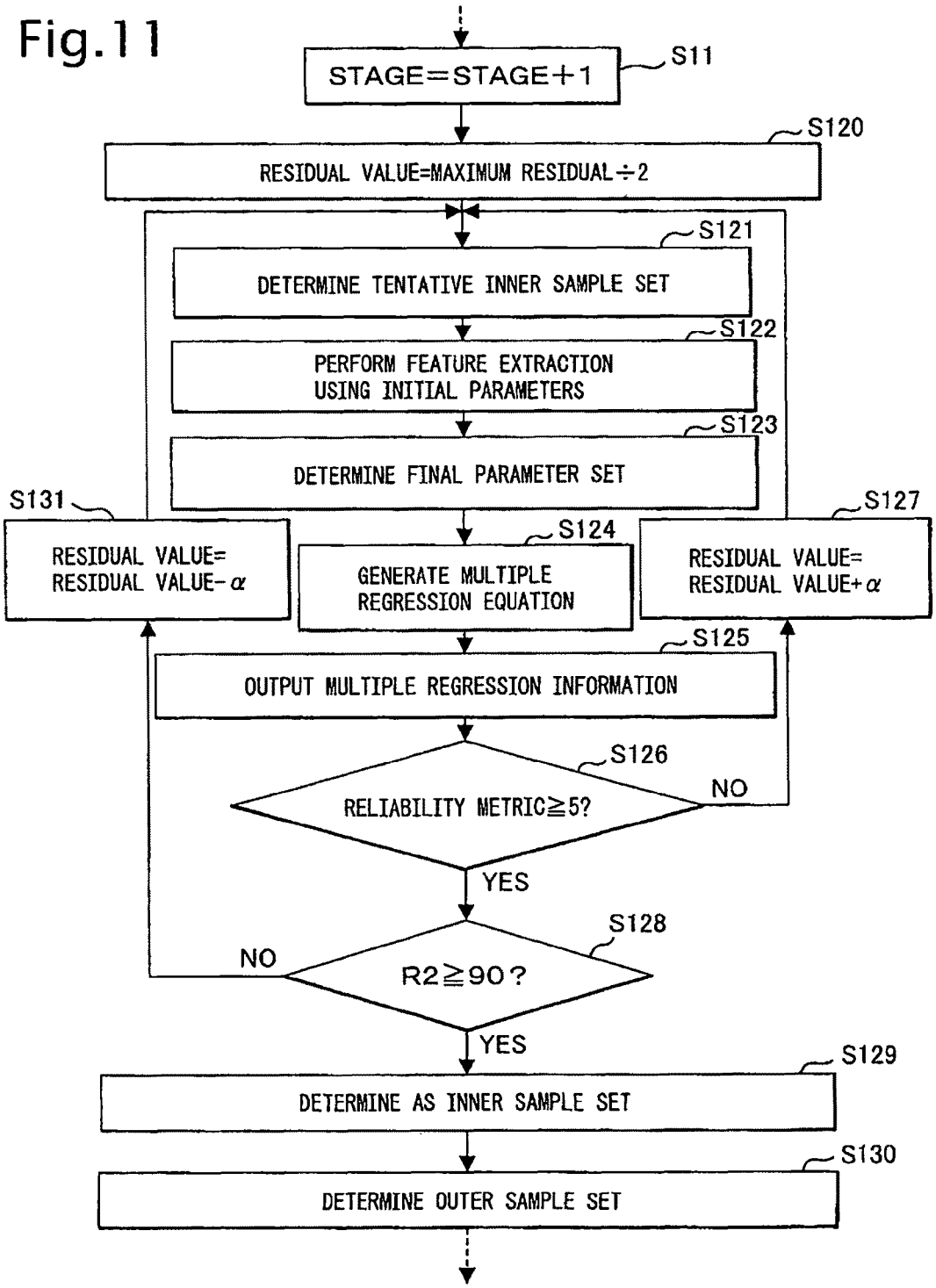

Fig. 14

| | NUMBER OF SAMPLES | NUMBER OF PARAMETERS | RELIABILITY METRIC | R2 VALUE | R VALUE | F-VALUE | CROSS VALIDATION (%) |
|---|---|---|---|---|---|---|---|
| STAGE-0 | 779 | 28 | 27.8 | 72.8 | 85.3 | 7.17 | 69.6 |
| STAGE-1 (INNER SAMPLES) | 398 | 22 | 18.1 | 96.2 | 98.1 | 428 | 94.4 |
| STAGE1 (OUTER SAMPLES) | 381 | 29 | 13.1 | 64.7 | 80.4 | 22.9 | 57.5 |
| STAGE2 (INNER SAMPLES) | 184 | 14 | 13.1 | 95.2 | 97.6 | 255 | 94.4 |
| STAGE2 (OUTER SAMPLES) | 197 | 31 | 6.4 | 66.9 | 81.8 | 10.8 | 32.0 |
| . | | | | | | | |
| . | | | | | | | |
| STAGEn (INNER SAMPLES) | 21 | 4 | 5.3 | 93.1 | 96.5 | 205 | 80.5 |
| STAGEn (OUTER SAMPLES) | 10 | 3 | 3.3 | 61 | 78.1 | 3.17 | 3.0 |

Fig.15

| | PREDICTION MODELS | |
|---|---|---|
| | MULTIPLE REGRESSION EQUATION $Y_{inn}$ FOR INNER SAMPLE SET | CLASS CLASSIFYING DISCRIMINANT FUNCTION Z FOR INNER SAMPLES AND OUTER SAMPLES |
| STAGE1 | $Y_{inn}(1) = \alpha 11 \cdot x1 + \alpha 12 \cdot x2 + \cdots + \alpha 1n \cdot xn + C(1)$ | $Z(1) = \beta 11 \cdot x1 + \beta 12 \cdot x2 + \cdots + \beta 1n \cdot xn + K(1)$ |
| STAGE2 | $Y_{inn}(2) = \alpha 21 \cdot x1 + \alpha 22 \cdot x2 + \cdots + \alpha 2n \cdot xn + C(2)$ | $Z(2) = \beta 21 \cdot x1 + \beta 22 \cdot x2 + \cdots + \beta 2n \cdot xn + K(2)$ |
| STAGE3 | $Y_{inn}(3) = \alpha 31 \cdot x1 + \alpha 32 \cdot x2 + \cdots + \alpha 3n \cdot xn + C(3)$ | $Z(3) = \beta 31 \cdot x1 + \beta 32 \cdot x2 + \cdots + \beta 3n \cdot xn + K(3)$ |
| ---- | ---- | ---- |
| STAGEn | $Y_{inn}(n) = \alpha n1 \cdot x1 + \alpha n2 \cdot x2 + \cdots + \alpha nn \cdot xn + C(n)$ | $Z(n) = \beta n1 \cdot x1 + \beta n2 \cdot x2 + \cdots + \beta nn \cdot xn + K(n)$ |

METHOD, APPARATUS, AND PROGRAM FOR GENERATING PREDICTION MODEL BASED ON MULTIPLE REGRESSION ANALYSIS

CROSS REFERENCE TO RELATED APPLICATION

The present application is a continuation application based on International Application No. PCT/JP2007/056478, filed on Mar. 27, 2007.

FIELD

The present invention relates to a method, apparatus, and program for generating by a fitting technique a prediction model (prediction equation) for predicting a physical, chemical, or physiological property of a sample when the data relating to the property is a continuous quantity, and more particularly to a method, apparatus, and program for generating a prediction model having high prediction reliability.

BACKGROUND

A data analysis technique applied to the generation of a model for predicting a physical, chemical, or physiological property (objective variable) of a sample when the objective variable is a numerically continuous quantity is generally called a fitting technique. A regression analysis technique is one typical analysis technique used for this purpose. In this technique, regression analysis is performed on a sample whose objective variable is known, by applying one or more of explanatory variables suitably selected, and a regression equation that defines the relationship between the objective variable and the explanatory variables is calculated; then, for a sample whose objective variable is unknown, the value of the objective variable is predicted using the regression equation. When the analysis involves the use of more than one explanatory variable, the analysis is called multiple regression analysis. The fitting techniques include such techniques as multiple linear regression, multiple nonlinear regression, PLS (Partial Least Squares), and neural networks, and any of these techniques can be used in the present invention.

The prediction reliability for an unknown sample depends on the goodness of fit of the multiple regression equation calculated using the multiple linear regression technique. The goodness of fit of the multiple regression equation is measured by the value of a correlation coefficient R or a coefficient of determination R2. The closer the value is to 1, the better the regression equation, and the closer the value is to 0, the worse the regression equation.

FIG. 1 depicts the results of the multiple linear regression analysis performed on a certain sample set. The figure depicts the correlation between the measured values and the calculated values (the values calculated using a prediction model) of the objective variable of the samples. The abscissa represents the measured value of the objective variable of each sample, and the ordinate represents the value of the objective variable Y of each sample calculated by a multiple regression equation (prediction model) obtained as a result of the multiple regression analysis. The multiple regression equation in this case is given by the following equation (1).

$$Y = \pm a1 \cdot x1 \pm a2 \cdot x2 \pm \ldots \pm an \cdot xn \pm C \quad (1)$$

In equation (1), Y indicates the calculated value of the objective variable of each sample, and $x1, x2, \ldots, xn$ indicate the values of the explanatory variables; further, $a1, a2, \ldots, an$ are coefficients, and C is a constant. By substituting the values of the explanatory variables into the above equation (1) for each sample, the value of the objective variable Y of the sample is calculated. When the value of the objective variable Y calculated by equation (1) coincides with the measured value of the sample, the sample indicated by an open circle lies on the regression line Y drawn in FIG. 1. Accordingly, the closer the samples cluster to the regression line Y, the regression equation is judged to be better (the reliability is higher). The reliability of the multiple regression equation is determined by the correlation coefficient R. When the correlation coefficient R is 1, the samples lie on the regression line. FIG. 1 depicts the case where the correlation coefficient R is 0.7.

Generally, when the number of samples is small, the samples can be made to lie on the regression line relatively easily. However, as the number of samples increases, the number of samples classified as noise relatively increases, making it extremely difficult to distribute all the samples so as to lie on the single regression line. In view of this, when the number of samples is large, an analysis technique is employed that divides the whole sample set into smaller subsets and obtains a regression equation on a subset-by-subset basis. When performing regression analysis on a subset-by-subset basis, it is of utmost importance how the whole sample set is divided into a plurality of subsets, and this greatly affects the reliability of the resulting regression equation as well as the predictability. Further, when predicting the objective variable of an unknown sample, making a selection as to which regression equation generated for which subset is used for the prediction of the sample is also an important issue, and if the selection is wrong, a totally unreliable prediction result, i.e., a value significantly departing from the actual value, may be generated.

Generally, increasing the reliability of the regression equation is of utmost concern in data analysis. In one technique to achieve this, samples located some distance away from the regression line, i.e., samples whose predicted values greatly differ from the measured values, are removed from the sample set in practice as a measure important to the generation of a good multiple regression equation. Samples located far away from the regression line are called outlier samples, and the value of the correlation coefficient R can be distinctly improved by removing such samples. A multiple linear regression program generally used to generate a multiple regression equation (prediction model) is designed to automatically generate a multiple regression equation that minimizes the occurrence of such outlier samples.

Accordingly, if the sample set contains even a single sample whose value of the objective variable departs far more widely from the regression line than the other samples, such an outlier sample will exert a significant influence in the generation of a multiple regression equation, and a multiple regression equation greatly affected by it will be generated. In data analysis, therefore, it is common practice to locate and remove such outlier samples from the sample set and to generate a multiple regression equation by using the remaining samples. In this case, the removed outlier samples are classified as noise in the data analysis and will never be used again in the data analysis process. That is, in the data analysis, information relating to the samples removed as outlier samples is discarded. As a result, if the multiple regression equation thus generated has a high correlation coefficient, the prediction reliability in the case of predicting samples similar or related to the outlier samples decreases, reducing the application range of the multiple regression equation and greatly affecting its versatility. Accordingly, in multiple regression analysis, it is desired to generate a multiple regression equation yielding a high correlation coefficient, while minimizing the occurrence of such outlier samples.

FIG. 2 is a diagram depicting the correlation between the measured values (abscissas) and calculated values (ordinates) of samples, for illustrating the method for improving the correlation coefficient R by removing outlier samples from the results of multiple regression analysis. In FIG. 2, the outlier samples are indicated at 1; when the multiple regression equation is generated by removing such outlier samples and using only the remaining samples clustering along the regression line 2, the correlation coefficient R improves. However, when the multiple regression equation is improved in this manner, since the information relating to the samples removed as noise is not reflected in the generation of a new multiple regression equation, as described above, the information that the outlier samples have is disregarded.

Such a multiple regression equation improvement is effective when the number of samples is relatively small as depicted in FIG. 2, but when the number of samples is large as in the case of FIG. 1, the number of outlier samples relatively increases; therefore, if an analysis is performed by simply taking a sample set, a multiple regression equation will be generated that is far part from reality and that is close to a local solution that lacks universality. As a result, analysis, prediction, etc. of the samples may not be performed with high reliability.

Further, when the purpose of the multiple regression analysis is simply a factor analysis, even the analysis technique that eliminates the outlier samples, such as depicted in FIG. 2, may be effective, but when the main purpose is to make a prediction about a sample whose objective variable is unknown, and when its prediction reliability is important, the above analysis technique is not suitable because its application range is limited due to loss of information.

For example, in the case of a chemical toxicity prediction problem or the like, the number of samples used for the generation of a multiple regression equation often becomes very large, and therefore, it becomes very difficult to obtain a high correlation coefficient. Further, in many cases, the variety of samples is bound to become large, and the proportion of samples eliminated as outlier samples tends to increase; this also makes it difficult to obtain a high correlation coefficient. As a result, even when performing multiple regression analysis on a relatively small number of samples, the prediction becomes extremely difficult. In this way, with the multiple regression technique that eliminates outlier samples and does not reuse them, the prediction reliability of the resulting multiple regression equation greatly drops. There is therefore a need for a novel multiple regression analysis technique that is neither the technique that divides a sample set into a plurality of subsets nor the technique that eliminates the outlier samples.

Many instances of chemical toxicity and pharmacological activity predictions using multiple linear or nonlinear regression analyses have been reported up to date (for example, refer to non-patent documents 1 and 2).

Non-patent document 1: Tomohisa Nagamatsu et al., "Antitumor activity molecular design of flavin and 5-deazaflavin analogs and auto dock study of PTK inhibitors," Proceedings of the 25th Medicinal Chemistry Symposium, 1P-20, pp. 82-83, Nagoya (2006)

Non-patent document 2: Akiko Baba et al., "Structure-activity relationships for the electrophilic reactivities of 1-β-O-Acyl glucuronides," Proceedings of the 34th Structure-Activity Relationships Symposium, KP20, pp. 123-126, Niigata (2006)

SUMMARY

Accordingly, the problem to be solved by the invention is to provide a prediction model generation method, apparatus, and program that can generate a prediction model having high prediction accuracy by performing multiple regression analysis exhibiting high correlation even when the number of samples is large and the variety of samples is also large.

According to a first aspect, to solve the above problem, there is provided a method for generating a prediction model based on multiple regression analysis using a computer, including: a) constructing an initial sample set from samples for each of which a measured value of the objective variable is known; b) obtaining a calculated value of the objective variable by applying multiple regression analysis to the initial sample set; c) extracting samples whose difference between the measured value and the calculated value is not larger than a first value, and calculating a correlation coefficient or a coefficient of determination by applying multiple regression analysis to a sub-sample set constructed from the extracted samples; d) repeating the step c) by changing the first value until the correlation coefficient or the coefficient of determination exceeds a second value; e) performing two-class classification to classify the sub-sample set obtained at the end of the step d) as a first sub-sample set and remaining samples as a second sub-sample set, and calculating a two-class classifying discriminant function; f) constructing a prediction model from a multiple regression equation obtained through the multiple regression analysis at the end of the step d) and from the discriminant function calculated in the step e); and g) replacing the initial sample set by the second sub-sample set, and repeating processing from the step b) to the step f), thereby obtaining a plurality of prediction models.

In the method above, training data is constructed using the plurality of samples whose measured values of the objective variable are known. Then, by applying multiple regression analysis to this training data, the calculated value of the objective variable is obtained for each sample. The calculated value of the objective variable is compared with the measured value, any sample for which the difference is not larger than the first value is extracted, and a tentative sub-sample set is constructed using such samples. When the first value is set, for example, to one half of the maximum residual value, the tentative sub-sample set does not contain samples having large residual values. The residual value is a value representing an error between the calculated value and the measured value, and samples with smaller residuals better fit the multiple regression equation.

Next, multiple regression analysis is applied to the sub-sample set to calculate the correlation coefficient or the coefficient of determination. The step of constructing the tentative sub-sample set is repeated by changing the first value until the correlation coefficient or the coefficient of determination exceeds the predetermined second value. Suppose that the second value is 90, for example, for the coefficient of determination; then, when the sub-sample set with the coefficient of determination higher than 90 is obtained by repeating the above step, the sub-sample set is then classified as the first sub-sample set. The samples remaining after removing the first sub-sample set from the initial sample set is classified as the second sub-sample set. Since the first sub-sample set has a high coefficient of determination, for example, higher than 90, the multiple regression equation generated to identify this sub-sample set is set as the prediction model for the first stage.

At the same time, the two-class classifying discriminant function is calculated using the first and second sub-sample sets, and this classifying discriminant function is set as the prediction model for the first stage together with the above multiple regression equation. Here, since the second sub-sample set is constructed from samples having relatively large residual values, its coefficient of determination is low, and a multiple regression equation having high accuracy can hardly be generated from the second sub-sample set.

However, in the present method, the initial sample set is replaced in the next stage by the second sub-sample set, and the same process as the process for generating the prediction model for the first stage is repeated thereby generating the first sub-sample set for the second stage. Since this first sub-sample set has a high coefficient of determination, the resulting multiple regression equation has high accuracy. Accordingly, this multiple regression equation is taken as the prediction model for the second stage. At the same time, the discriminant function for classifying the first and second sub-sample sets is also generated. Thereafter, by sequentially generating the prediction models for the third and fourth stages in like manner, the prediction models containing information of almost all the samples and hence having high accuracy can be obtained.

The stage-by-stage prediction model generation process stops generating further prediction models when the ratio of the number of samples contained in the second sub-sample set to the number of initial parameters used in the multiple regression analysis performed to determine that sample set has decreased below a predetermined value, for example, 5. Alternatively, provisions may be made to stop the process when the number of stages has exceeded a predetermined number.

According to a second aspect, to solve the above problem, there is provided a program for generating a prediction model based on multiple regression analysis by causing a computer to execute the steps of: a) constructing an initial sample set from samples for each of which a measured value of an objective variable is known; b) obtaining a calculated value of the objective variable by applying multiple regression analysis to the initial sample set; c) extracting samples whose difference between the measured value and the calculated value is not larger than a first value, and calculating a correlation coefficient or a coefficient of determination by applying multiple regression analysis to a sub-sample set constructed from the extracted samples; d) repeating the step c) by changing the first value until the correlation coefficient or the coefficient of determination exceeds a second value; e) performing two-class classification to classify the sub-sample set obtained at the end of the step d) as a first sub-sample set and remaining samples as a second sub-sample set, and calculating a class classifying discriminant function; f) constructing a prediction model from a multiple regression equation obtained through the multiple regression analysis at the end of the step d) and from the discriminant function calculated in the step e); and g) replacing the initial sample set by the second sub-sample set, and repeating processing from the step b) to the step f), thereby obtaining a plurality of prediction models.

According to a third aspect, to solve the above problem, there is provided a method for generating a chemical toxicity prediction model based on multiple regression analysis, including the steps of: a) taking a given toxicity of a chemical as an objective variable, and constructing an initial sample set from chemicals for each of which a measured value of the objective variable is known; b) obtaining a calculated value of the objective variable by applying multiple regression analysis to the initial sample set; c) extracting chemicals whose difference between the measured value and the calculated value is not larger than a first value, and calculating a correlation coefficient or a coefficient of determination by applying multiple regression analysis to a sub-sample set constructed from the extracted samples; d) repeating the step c) by changing the first value until the correlation coefficient or the coefficient of determination exceeds a second value; e) performing two-class classification to classify the sub-sample set obtained at the end of the step d) as a first sub-sample set and remaining samples as a second sub-sample set, and calculating a class classifying discriminant function; f) constructing a prediction model from a multiple regression equation obtained through the multiple regression analysis at the end of the step d) and from the discriminant function calculated in the step e); and g) replacing the initial sample set by the second sub-sample set, and repeating processing from the step b) to the step f), thereby obtaining a plurality of prediction models.

According to a fourth aspect, to solve the above problem, there is provided an apparatus for generating a prediction model based on multiple regression analysis, including: a first unit which constructs an initial sample set from samples for each of which a measured value of an objective variable is known; a second unit which obtains a calculated value of the objective variable by applying multiple regression analysis to the initial sample set; a third unit which extracts samples whose difference between the measured value and the calculated value is not larger than a first value, and calculates a correlation coefficient or a coefficient of determination by applying multiple regression analysis to a sub-sample set constructed from the extracted samples; a fourth unit which causes the third unit to continue processing by changing the first value until the correlation coefficient or the coefficient of determination exceeds a second value; a fifth unit which performs two-class classification to classify the sub-sample set obtained at the end of processing by the fourth unit as a first sub-sample set and remaining samples as a second sub-sample set, and calculates a class classifying discriminant function; a sixth unit which constructs a prediction model from a multiple regression equation obtained through the multiple regression analysis at the end of processing by the fourth unit and from the discriminant function calculated by the fifth unit; and a seventh unit which causes the processing by the second, third, fourth, fifth, and sixth units to be executed repeatedly by replacing the initial sample set by the second sub-sample set.

According to the method, program, and apparatus described above, even when the number of samples is large, and the variety of samples is also large, prediction models having high prediction accuracy can be generated by performing multiple regression analysis having high correlation. Accordingly, prediction models having high prediction accuracy can be constructed, for example, for prediction of chemical toxicity which involves more than 1000 samples of a large variety of kinds, and the resulting effect is enormous. The effect is particularly marked when predicting 50% inhibitory concentration, 50% effective concentration, 50% lethal concentration, biodegradability or bioaccumulativeness of chemicals, etc. where the objective variable varies continuously.

BRIEF DESCRIPTION OF DRAWINGS

FIG. 7 is a data table for storing a final parameter set.

FIG. 8 is a data table depicting multiple regression analysis information.

FIG. 11 is a flowchart depicting the details of step S12 of FIG. 6.

FIG. 14 is a diagram depicting multiple regression information obtained in various stages.

FIG. 15 is a prediction model storing table.

DESCRIPTION OF EMBODIMENTS

Before describing embodiments of the present invention, the principles of the invention will be described first.

Figure 3:
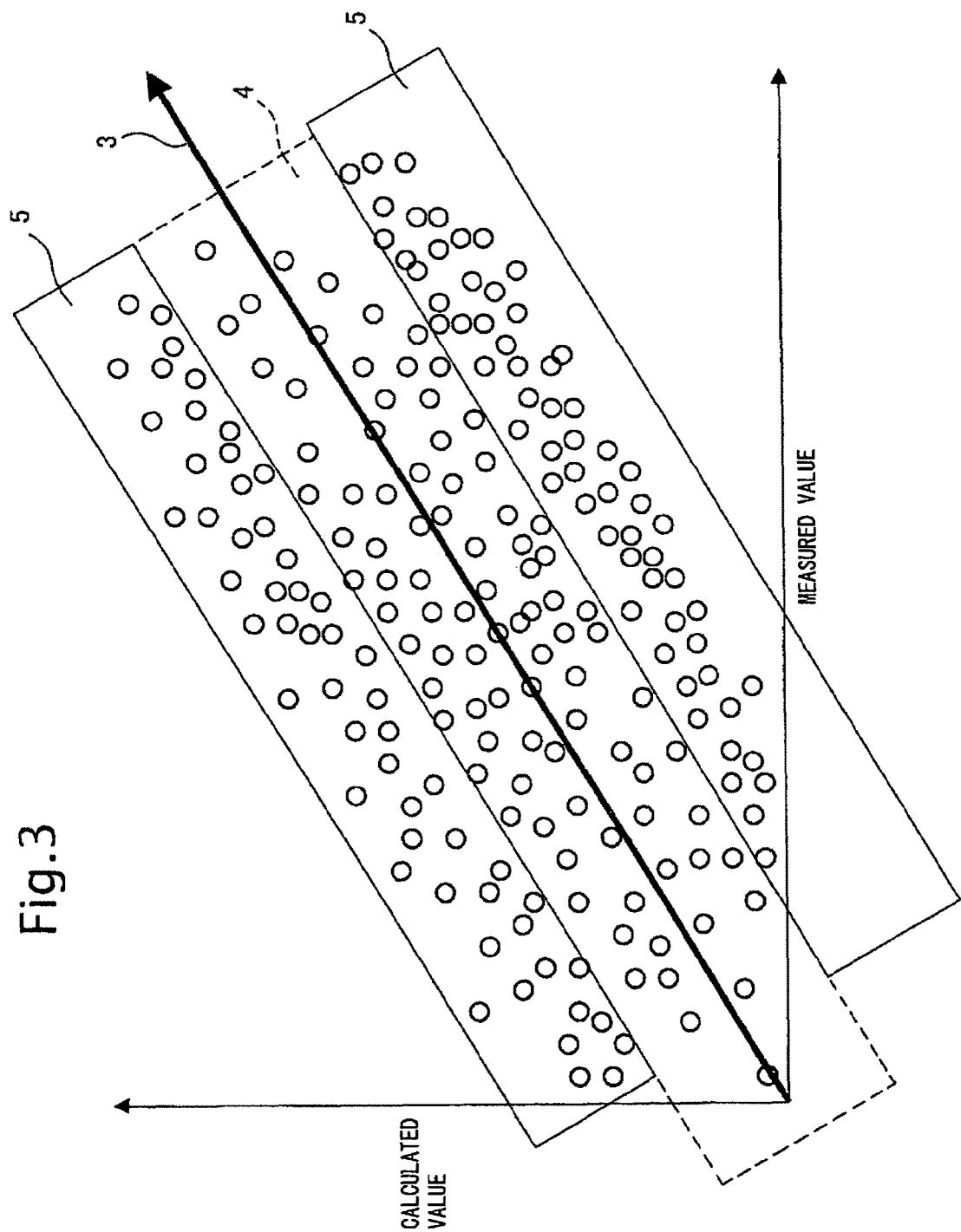
FIG. 3 is a diagram for illustrating the principles of the present invention, depicting how the sample space resulting from multiple regression analysis is divided into an inner region and an outer region.

As earlier described, a multiple regression equation having a high correlation coefficient R could be obtained by applying multiple regression analysis to a new sample set generated by eliminating outlier samples from the whole sample space. However, with this method, various kinds of information that the outlier samples have would be lost. To address this, the inventor has considered dividing the sample space resulting from the initial multiple regression analysis into two regions 4 and 5, as depicted in FIG. 3, and applying multiple regression analysis to the subset of samples belonging to each region.

The region 4 is the region located near the regression line 3 obtained by the initial multiple regression analysis, and the region 5 is the region located farther away from the regression line 3. Here, the region 4 located near the regression line 3 is designated as the "inner region" and the region 5 as the "outer region." The samples belonging to the inner region are called the "inner samples," and the samples belonging to the outer region are called the "outer samples."

The inner and outer regions 4 and 5 are each determined according to the distance from the regression line 3. Actually, they are determined based on the residuals of the samples arising from the initial multiple regression analysis. The "residuals" refer to the errors between the measured values and the values calculated by the multiple regression equation (the calculated values). Here, a value equal to one half of the maximum residual in the initial multiple regression analysis is taken as the threshold value, and a new sample set is constructed by selecting samples having residuals not larger than the threshold value; then, multiple regression analysis is applied to this sample set to obtain the correlation coefficient R.

If the value R is, for example, 95 or less (the value of the correlation coefficient being expressed relative to 100%), the threshold residual value is set lower to narrow down the samples, and multiple regression analysis is again applied to the thus narrowed down sample set. If, in this case, the value of the correlation coefficient R exceeds 95, the sample set subjected to the multiple regression analysis is determined as the sample set belonging to the inner region 4, that is, the inner samples. Once the inner region 4 is determined, the outer region 5 is automatically determined.

In this present invention, when the inner samples for which the value of the correlation coefficient R exceeds 95 are determined as described above, the inner samples are removed from the whole sample set, and a new sample set is formed using the samples belonging to the outer region 5; then, the multiple regression analysis is applied to the thus formed new sample set.

Figure 4:
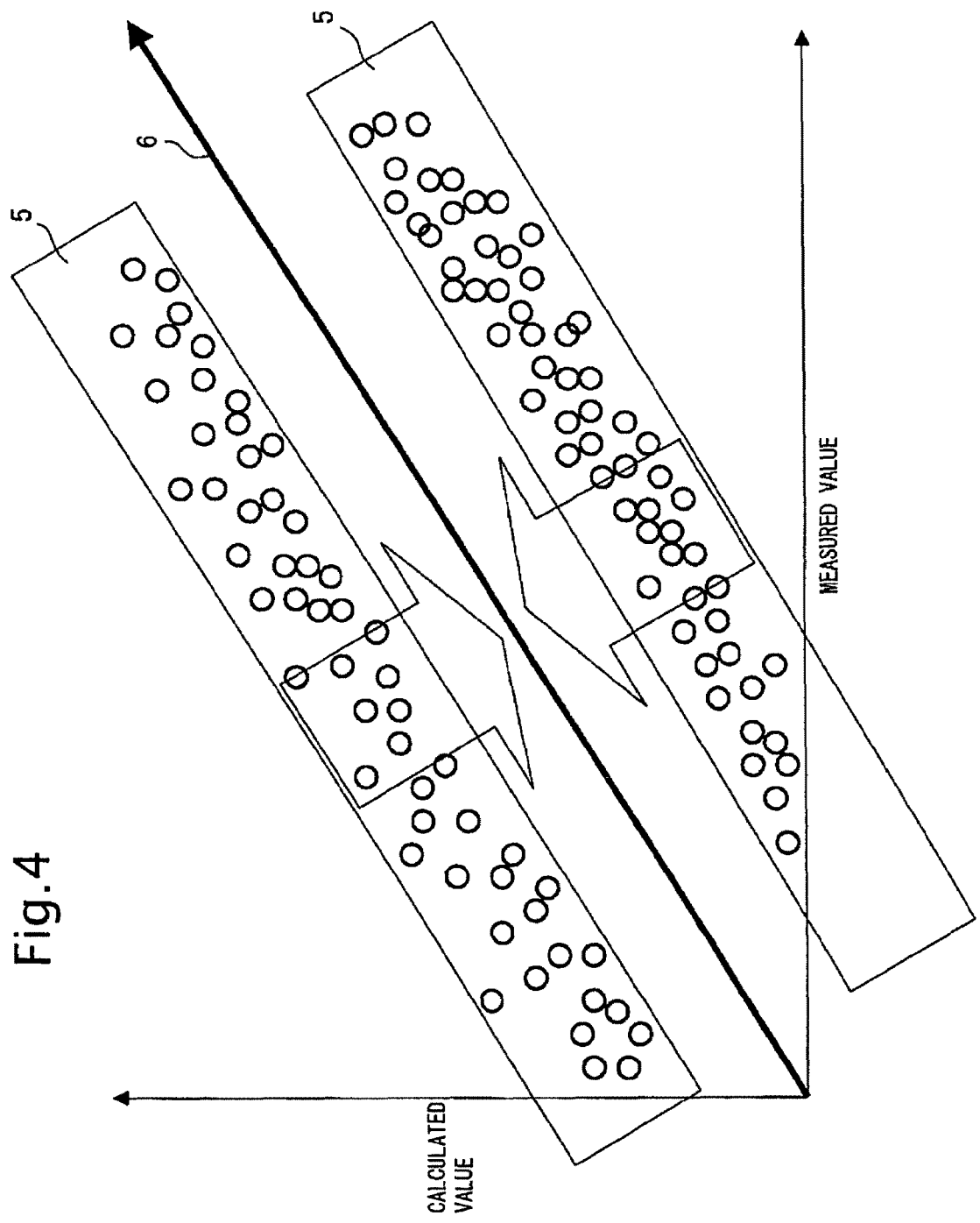
FIG. 4 is a diagram for illustrating the multiple regression analysis applied to a new sample set formed by removing samples in the inner region depicted in FIG. 3.
Figure 5:
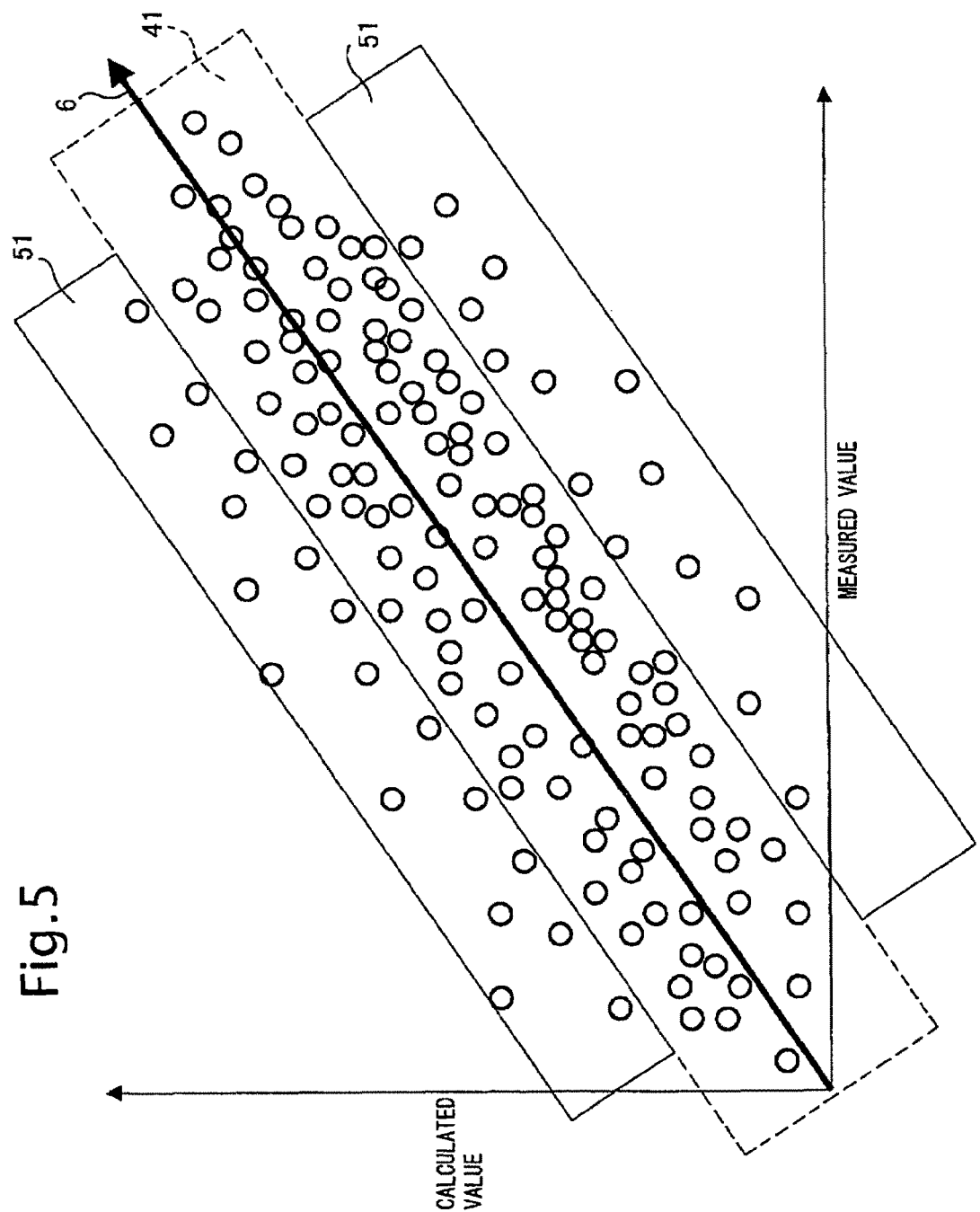
FIG. 5 is a diagram depicting the result of the multiple regression analysis performed using samples in the outer region depicted in FIG. 4.

FIG. 4 is a diagram for illustrating the result of the multiple regression analysis applied to the samples in the outer region 5. As depicted in FIG. 4, when the inner samples are removed from the whole sample set, the samples located in the outer region 5 fall into the now vacant previous inner region, forming a new multiple regression line 6. FIG. 5 depicts a correlation diagram based on the new sample set thus formed.

In the multiple regression analysis result depicted in FIG. 5, if the value of the correlation coefficient R calculated by the multiple regression equation 6 is, for example, 95 or less, an inner region 41 and an outer region 51 can be determined based on the multiple regression equation 6 in the same manner as the initially determined inner samples and outer samples depicted in FIG. 3. In this way, a multiple regression equation depicting a high correlation coefficient value, for example, higher than 95, for the thus determined inner samples can be obtained along with a sample set (outer sample set) that is subjected to the subsequent multiple regression analysis.

By repeating the above procedure, for example, until the number of samples located in the outer region decreases below a predetermined value, a plurality of multiple regression equations having high correlation coefficient values can be obtained. Information that almost all the samples have is contained in the multiple regression equation set without being discarded. Furthermore, by repeating the above procedure, the multiple regression equations can be generated using almost all the samples, no matter how large the number of samples may be. Accordingly, by using this multiple regression equation set as a prediction model, unknown samples can be predicted with high reliability. This technique is unaffected by the magnitude of the number of samples and, even when handling a sample set containing a large variety of samples, multiple regression equations having high correlation coefficients can be easily constructed.

One embodiment of the present invention will be described below.

Figure 6:
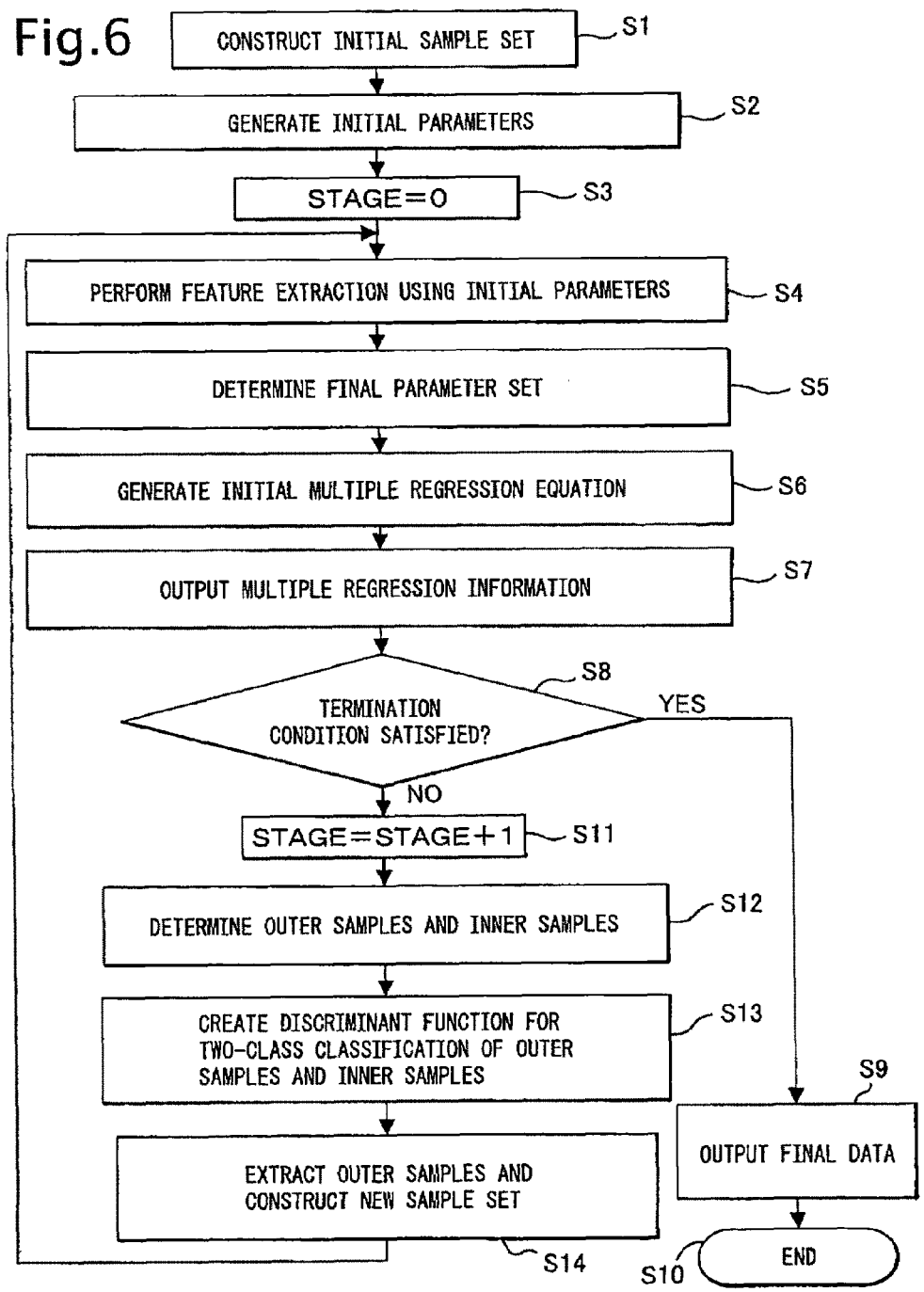
FIG. 6 is a flowchart illustrating a procedure for implementing a prediction model generation method according to one embodiment of the present invention.

FIG. 6 is a flowchart illustrating the overall procedure for implementing a prediction model generation method according to one embodiment of the present invention. First, in step S1, a set of samples whose values of the objective variable to be analyzed are known is prepared. In this embodiment, the IC50 is taken as the objective variable. The IC50 means 50% inhibitory concentration which is the concentration of a chemical that is considered to inhibit swimming, multiplication, growth (bloom in the case of algae), enzymic activity, etc. for 50% of a set of test subjects, and provides an extremely important measure in the evaluation of environmental toxicity.

Next, in step S2, initial parameters (explanatory variables) used in multiple regression analysis are generated for each sample. ADMEWORKS-ModelBuilder (registered trademark) marketed by Fujitsu can automatically generate 800 or more parameters based on the two- or three-dimensional structural formulas and various properties of chemicals. Next, STAGE is set to 0 (step S3), and feature extraction is performed on the initial parameters generated in step S2, thereby removing noise parameters not needed in multiple regression analysis (step S4) and thus determining the final parameter set (step S5).

FIG. 7 depicts a data table of the final parameter set. Column 10 in FIG. 7 indicates the sample ID for identifying each chemical. Column 11 indicates the value of the objective variable of each sample in units of μMol. In this embodiment, the IC50 value is taken as the objective variable. Column 12 depicts the names of the explanatory variables forming the final parameter set. In this embodiment, the total number of atoms ($x_1$) in each sample, the number of carbon atoms ($x_2$), the number of oxygen atoms ($x_3$), the number of nitrogen atoms ($x_4$), the number of sulfur atoms ($x_5$), the number of fluorine atoms ($x_6$), the number of chlorine atoms ($x_7$), the number of bromine atoms ($x_8$), etc. are taken as the explanatory variables.

In the table of FIG. 7, the numeric value carried in each cell is a parameter value for the corresponding sample. For example, it is depicted that the chemical of the sample ID 3 has an IC50 value of 3.2 μM (micromols), and that the total number of atoms in the chemical is 21, of which the number of carbon atoms is 15 and the number of oxygen atoms is 6, and the chemical does not contain any nitrogen, sulfur, fluorine, chlorine, or bromine atoms.

Figure 1:
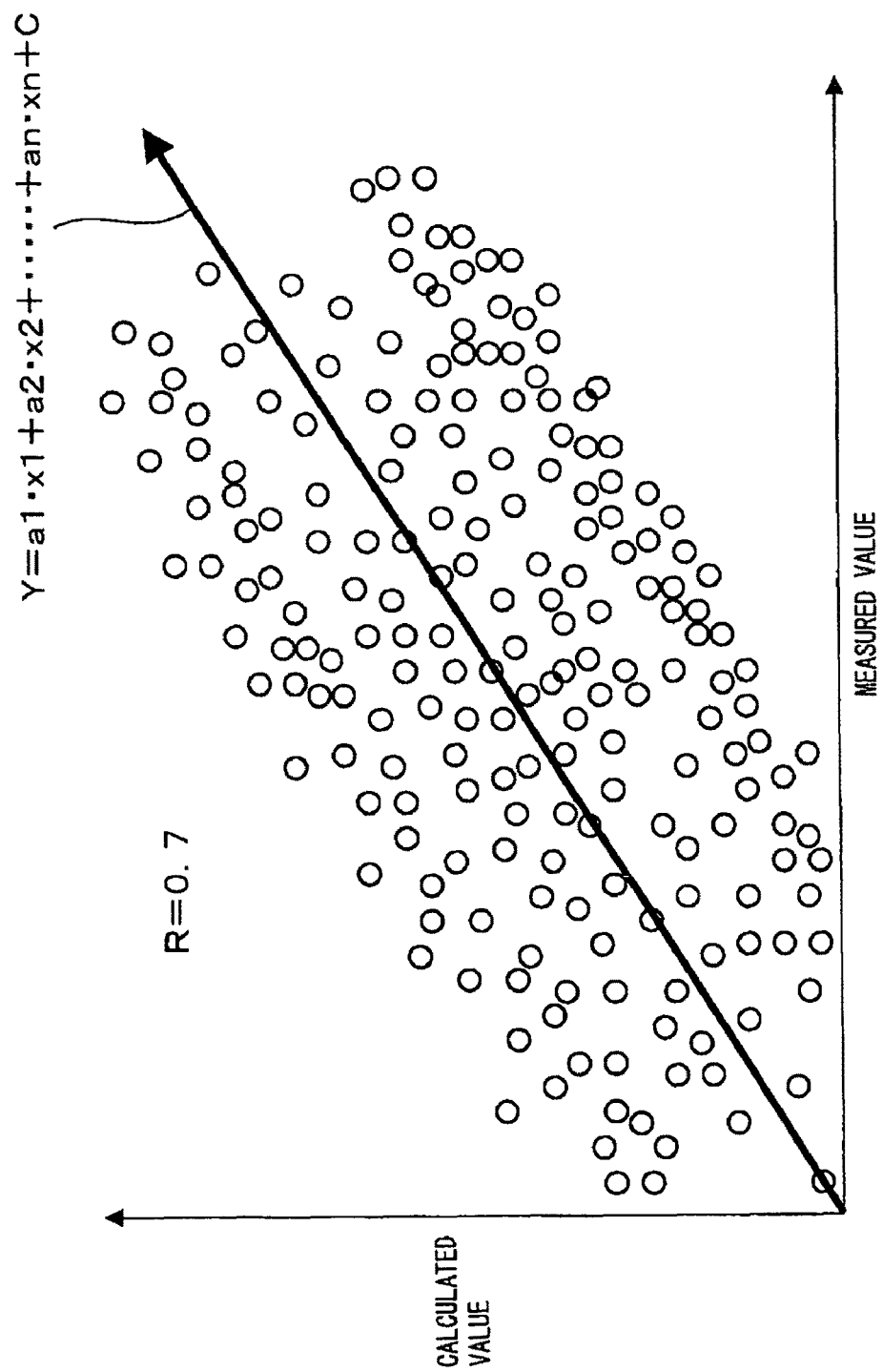
FIG. 1 is a diagram for illustrating a prior art multiple regression analysis, depicting the relationship of the measured values of samples versus their calculated values obtained by the multiple regression analysis.
Figure 2:
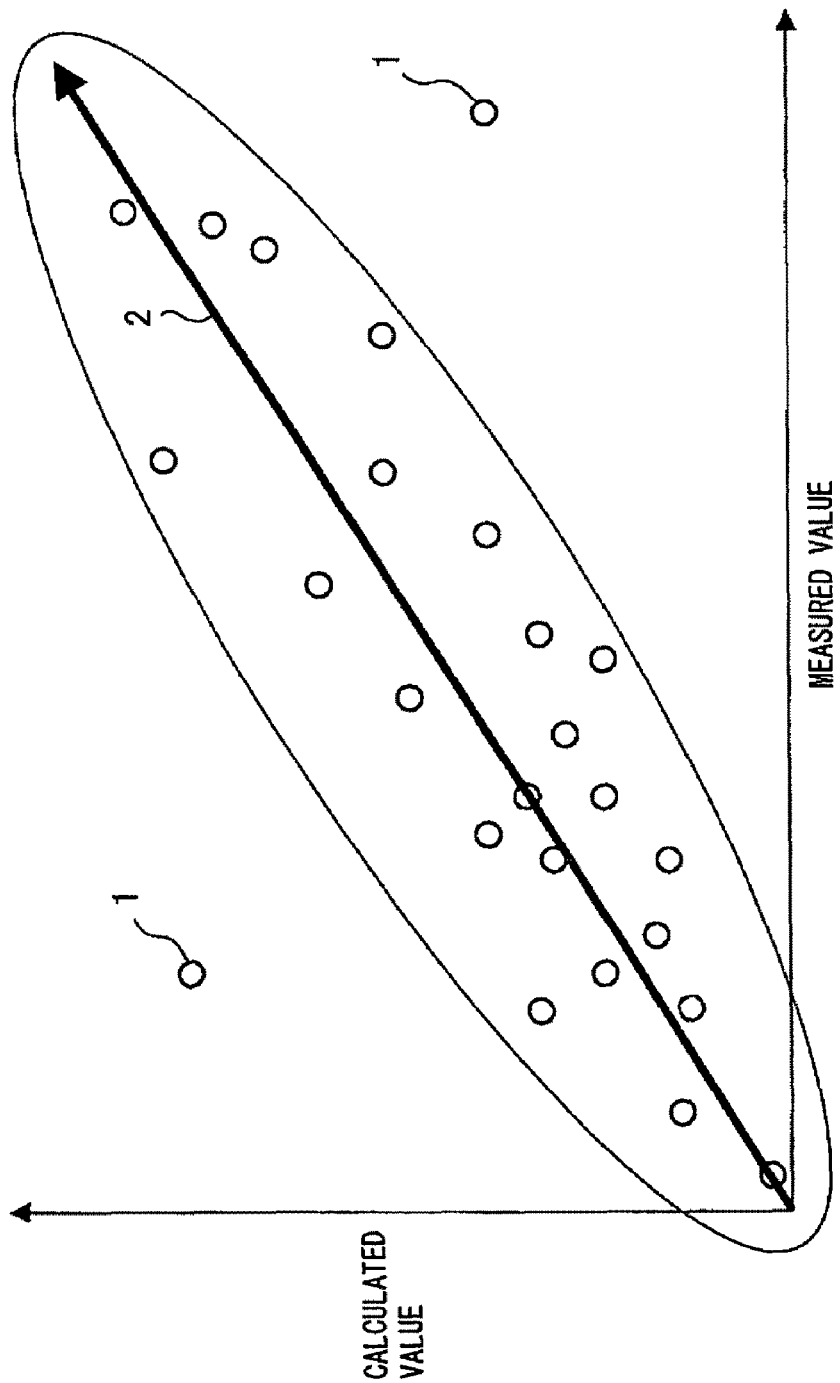
FIG. 2 is a diagram for illustrating a prior art multiple regression analysis technique, depicting the result of multiple regression analysis by removing outlier samples.

In step S6 of FIG. 6, an initial multiple regression equation is generated by performing multiple regression analysis using the data depicted in the data table of FIG. 7. The initial multiple regression equation is given as follows.

$$Y_0 = a_1 \cdot x_1 + a_2 \cdot x_2 + \ldots + a_n \cdot x_n + C_0 \quad (2)$$

where $a_1, a_2, \ldots, a_n$ are coefficients for the respective parameters $x_1, x_2, \ldots, x_n$, and $C_0$ is a constant. By substituting the parameter values of each sample depicted in FIG. 7 into the above equation (2), the value of the objective variable of the sample is calculated. By plotting the thus calculated objective variable values of the respective samples against their measured values, a diagram depicting the correlation between the calculated values and measured values of the respective samples, such as depicted in FIG. 1, is obtained.

FIG. 8 is a table depicting the multiple regression equation generated in the initial multiple regression analysis performed in step S6 and its related data. The data is output in step S7. As a result of the initial multiple regression analysis, the coefficients $a_1$, $a_2$, etc. for the respective parameters and the constant $C_0$ are determined, and various kinds of statistical information are calculated. The statistical information includes number of samples, number of parameters, reliability metric (number of samples/number of parameters), value of the coefficient of determination $R^2$, value of the correlation coefficient R, F-test value, cross validation (%), etc. Here, the reliability metric is defined by the value obtained by dividing the number of samples by the number of parameters, and if this value is small, the multiple regression equation generated using the samples and their parameters has hardly any scientific or data analytic meaning, and it is determined that the analysis has failed, no matter how high the $R^2$ value or R value is. Usually, when this value is larger than 5, the analysis is judged to be a meaningful data analysis (successful analysis), and as the value becomes farther larger than 5, the reliability of the multiple regression equation becomes correspondingly higher. Any multiple regression equation obtained under conditions where the value is smaller than 5 is judged to have been generated by a meaningless data analysis, and it is determined the data analysis has failed. Accordingly, in the multiple regression analysis, this reliability metric provides a measure of greater importance than the $R^2$ or R value.

In this embodiment, the analysis has been performed by setting the minimum acceptable value of the reliability metric to 5. Since the terms coefficient of determination $R^2$, correlation coefficient R, F-test value, and cross validation are well known in the field of multiple regression analysis, their detailed definitions will not be given here. This embodiment employs the value of the coefficient of determination $R^2$ to measure the goodness of fit of the multiple regression analysis, but it will be appreciated that the correlation coefficient R may be used instead of the coefficient of determination $R^2$. In the following description, the value of the coefficient of determination $R^2$ is expressed as a percentage of its maximum value 100%.

Though not depicted in FIG. 8, the value of the objective variable Y of each sample is calculated in accordance with equation (2) by using the values of the coefficients $a_1$, $a_2$, etc. and the constant C depicted in FIG. 8 and the parameter values depicted in FIG. 7, and the thus calculated value is stored in the data table and output. The residual value is also calculated for each sample and is stored. The residual value is a value indicating the difference of the calculated value of the objective variable relative to the measured value of the objective variable.

Figure 9:
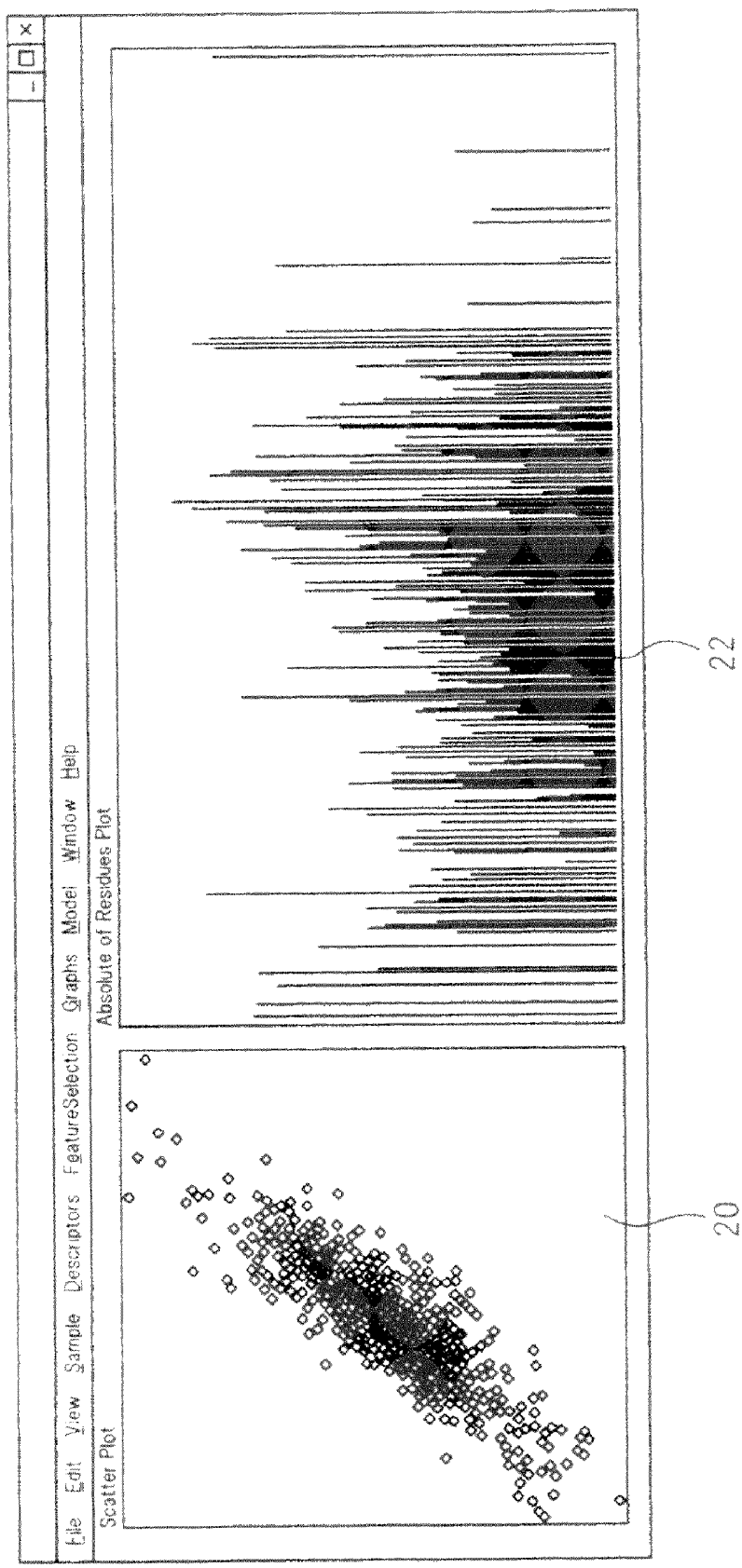
FIG. 9 is a graphical representation of the results of multiple regression analysis.

FIG. 9 is a graphical representation of the results of the initial multiple regression analysis performed in step S6. In FIG. 9, reference numeral 20 indicates a graph plotting the calculated values of the objective variable against the measured values for the respective samples, and 22 indicates a graph plotting the residuals of the respective samples. In the graph 20, the abscissa represents the measured value of the objective variable, and the ordinate the calculated value of the objective variable. In the graph 22, the abscissa represents the sample ID, and the ordinate the residual. As the residual increases, the sample is located farther away from the applicable range of the initial multiple regression equation generated in step S6. That is, such a sample is located at a substantial distance away from the multiple regression equation defined by the straight line passing through points equally distanced from the X axis (abscissa) and the Y axis (ordinate) in FIG. 1.

In step S8, it is determined whether the termination condition is satisfied or not, that is, whether subsequent multiple regression analysis is needed or not. In this embodiment, the following three conditions are checked as the termination condition. The first condition concerns the case where the result of the multiple regression analysis performed in step S6 has sufficiently high accuracy and no further analysis is needed. This condition is satisfied, for example, when the coefficient of determination R2 is 90 or higher. Alternatively, it may be determined that the condition is satisfied when the correlation coefficient R is 95 or higher. When such a condition is satisfied, it can be determined that the multiple regression analysis performed in step S6 has sufficiently high accuracy; therefore, no further analysis is performed, and the data obtained in step S7 is output as the final data (step S9), whereupon the process is terminated (step S10).

The second condition is whether the reliability metric of the multiple regression analysis performed in step S6 is less than 5 or not. That is, when the number of samples used in the analysis has decreased and become smaller than, for example, five times the number of parameters, the multiple regression analysis has no longer scientific meaning. Accordingly, when the reliability metric is less than 5, the YES branch of step S8 is followed to terminate the process. Here, instead of the reliability metric, simply the minimum number of samples may be used as the termination condition. The third condition is whether the number of stages has exceeded a predetermined number. This is a form of forceful termination, and is a condition used to forcefully terminate the process when the analysis result does not settle down for some reason.

Figure 10A:
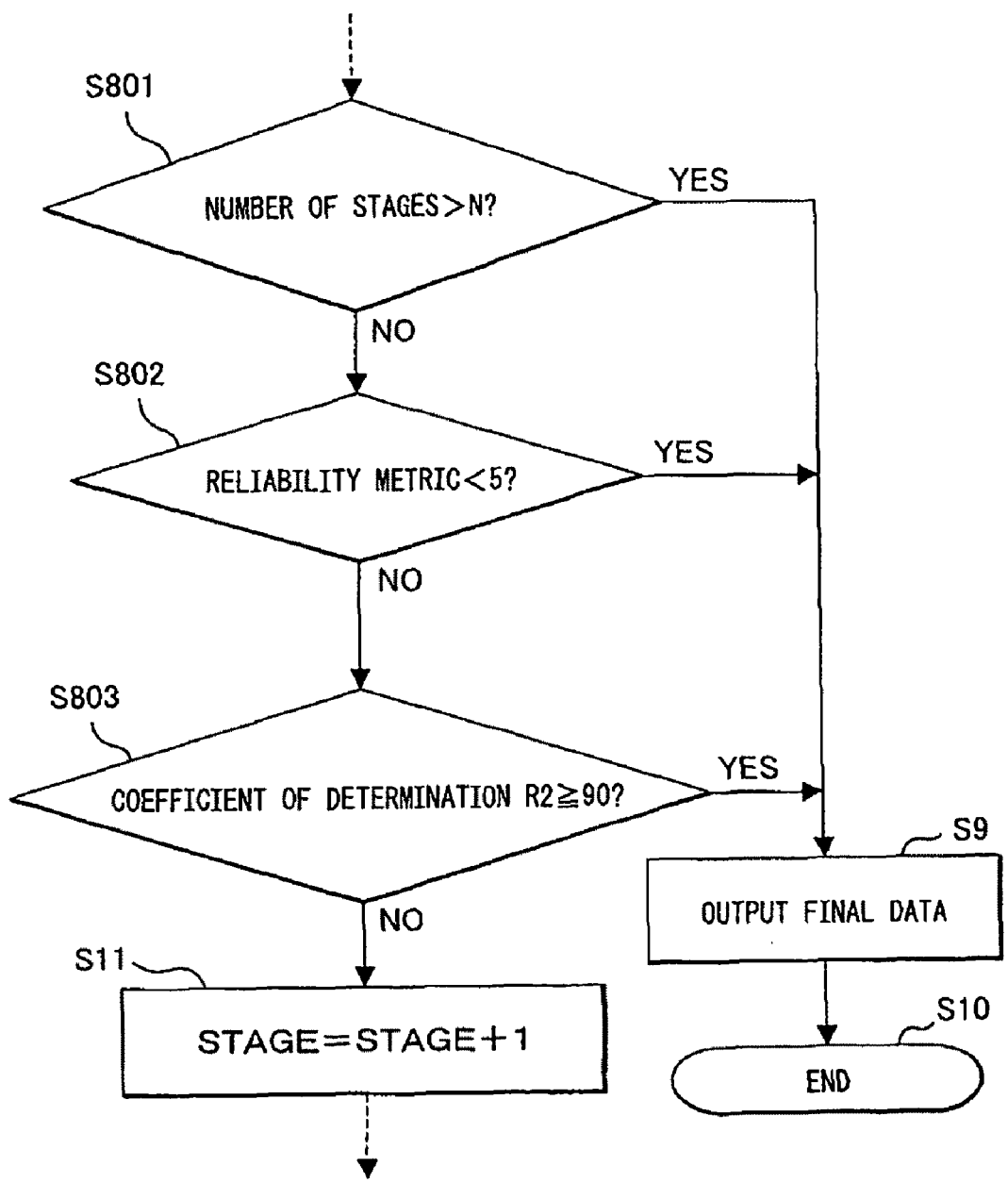
FIG. 10A is a flowchart depicting the details of step S8 of FIG. 6.
Figure 10B:
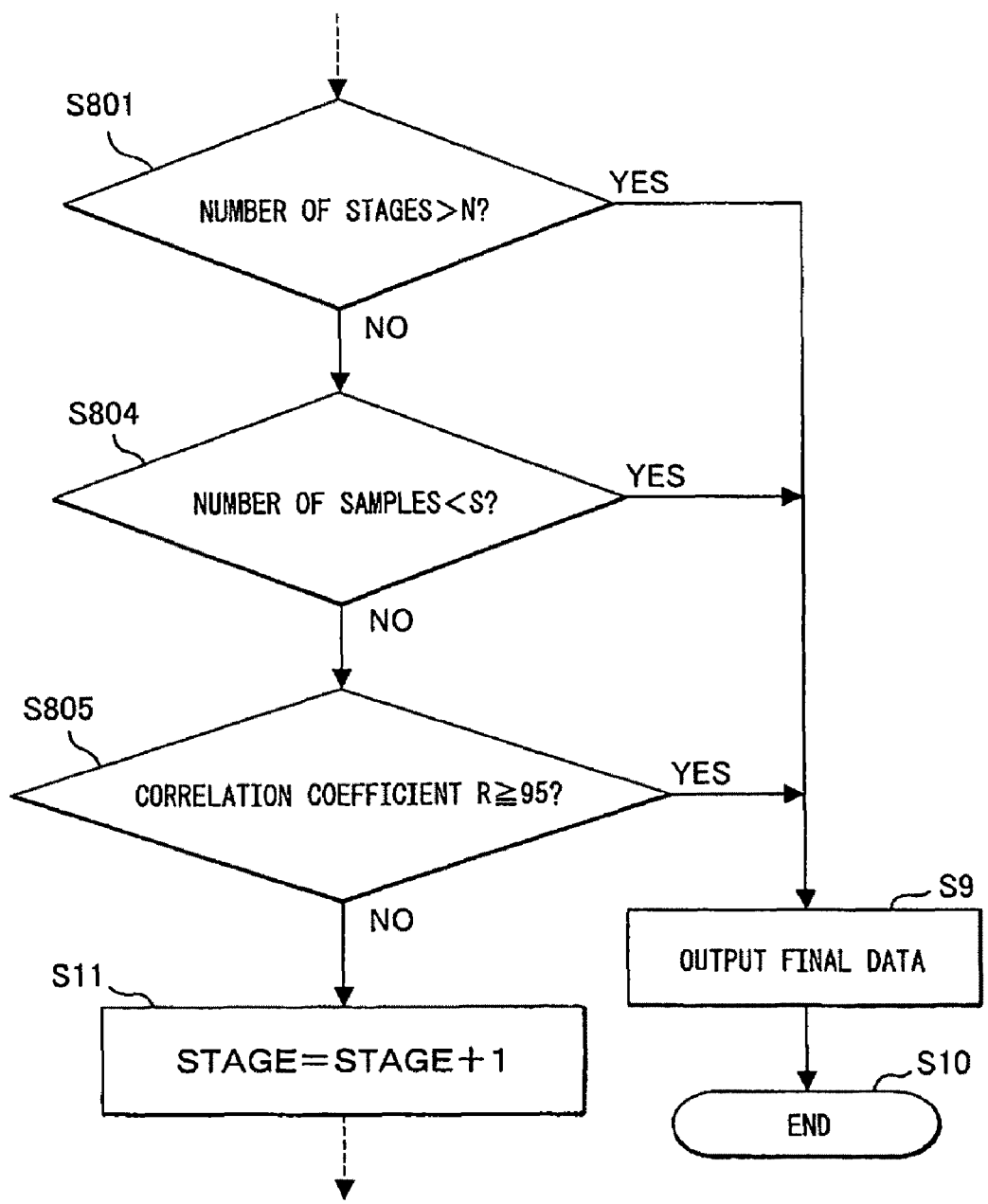
FIG. 10B is a flowchart depicting an alternative embodiment of step S8 of FIG. 6.

FIGS. 10A and 10B are flowcharts depicting the details of step S8. First, in step S801, it is determined whether the number of stages has exceeded a predetermined number N. If YES in step S801, the process proceeds to step S9 and then to S10 where the process is terminated. If NO in step S801, it is determined in step S802 whether the reliability metric is less than 5 or not. If YES in step S802, the process proceeds to step S9 and then to S10 where the process is terminated. In this embodiment, the minimum acceptable value of the reliability metric is set to 5, but this value can be chosen suitably according to the purpose of the analysis.

If NO in step S802, it is determined in step S803 whether or not the value of the coefficient of determination R2 is 90 or higher. If YES in step S803, the process proceeds to step S9 and then to S10 where the process is terminated. If NO in step S803, that is, if the number of stages does not exceed the predetermined number N, and the reliability metric is 5 or higher, and if the coefficient of determination R2 is less than 90, then the process proceeds to step S11 to continue the process, since further multiple regression analysis according to the present invention is needed.

In the case of FIG. 10B, in step S804 the minimum number of samples, S, is defined as a criterion instead of the reliability metric, and when the number of samples to be analyzed has decreased below the predefined minimum number S, the process is terminated. Further, in step S805, the correlation coefficient R is used for evaluation instead of the coefficient of determination R2, and when R is 95 or higher, the process is terminated. In the flowcharts of FIGS. 10A and 10B, the various numeric values can be chosen suitably according to the purpose of the analysis.

Turning back to FIG. 6, if NO in step S8, the number of stages is incremented by 1 in step S11, and the process proceeds to step S12 to determine the outer samples and inner samples. The outer samples are samples contained in the region 5 in FIG. 3, and the inner samples are samples contained in the region 4. As illustrated, each sample is classified as an inner sample or an outer sample according to the distance from the multiple regression line 3, i.e., the value of the residual of the sample. The method of determining the outer samples and inner samples will be described in detail later with reference to FIG. 11, but in the process depicted here, inner samples are tentatively determined based on the magnitude of the residual value, and multiple regression analysis is applied to this inner sample set, to see whether a multiple regression equation in which the coefficient of determination R2 is 90 or higher can be obtained or not.

If the coefficient of determination R2 whose value is 90 or higher can be obtained, the tentative inner sample set is determined as the final inner sample set. If the coefficient of determination is less than 90, a second tentative inner sample set is generated by removing samples having large residuals from the first tentative inner sample set, and the coefficient of determination is calculated by performing the multiple regression analysis once again. By repeating such a procedure until the value of the coefficient of determination becomes equal to or higher than 90, the final inner sample set is determined. Once the inner sample set is determined, the outer sample set is determined by removing the inner sample set from the initial sample set. The multiple regression equation used to determine the inner sample set is incorporated as part of the prediction model (multiple regression equation) for STAGE 1.

When the inner samples and outer samples are determined in step S12, two-class classification is performed in step S13, one class being the inner sample set and the other being the outer sample set, and a discriminant function Z for classifying the inner and outer samples is created and stored. Any suitable two-class classification technique can be used here, but if the classification technique proposed by the inventor in Japanese Patent Application No. 2006-307277, a discriminant function having higher accuracy can be obtained. The thus created discriminant function constitutes the prediction model set for STAGE 1 together with the multiple regression equation obtained in step S12.

In step S14, a new sample set is constructed by extracting only the outer samples, and the process from step S4 onward is repeated for this sample set. In this case, if it is determined in step S8 that the result of the multiple regression analysis performed on these outer samples satisfies the termination condition (YES in step S8), the prediction model for STAGE 1 is output as the final data (step S9), and the series of multiple regression analyses is terminated (step S10). If the termination condition is not satisfied in step S8 (NO in step S8), the process proceeds to step S11 to carry out the subsequent process to generate the prediction model for STAGE 2. By repeating the process from step S4 to step S14 in like manner until the termination condition is satisfied in step S8, as many prediction model sets as there are stages are generated.

In the flowchart of FIG. 6, the process loops from step S14 back to step S4 where feature extraction is performed once again by using the initial parameters, but step S4 may be omitted at some sacrifice of accuracy. In that case, the process loops from step S14 to step S5, and the subsequent analysis is performed using the final parameter set generated in STAGE 0. According to this procedure, the processing time can be greatly reduced by eliminating the need for the feature extraction step for the initial parameters.

FIG. 11 is a flowchart illustrating the procedure for determining the inner samples and outer samples, i.e., the details of step S12 of FIG. 6. In this embodiment, the residuals are used to determine the inner samples and outer samples, as earlier described. The residual is calculated for each individual sample, as depicted in the graph 22 of FIG. 9. For this purpose, in step S120 of FIG. 11, the residual value is set equal to one half of the maximum residual; then, any sample whose residual is larger than the thus set residual value is tentatively classified as an outer sample, and any sample whose residual is not larger than the thus set residual value is tentatively classified as an inner sample (step S121).

Steps S122 to S125 define a procedure to apply multiple regression analysis to the tentative inner sample set determined in step S122 and to output the multiple regression information. The details of these steps are the same as those of the steps S4 to S7 depicted in the flowchart of FIG. 6, and the description will not be repeated here. In the flowchart of FIG. 11 also, step S122 may be omitted for the same reason as earlier described. When the multiple regression information relating to the tentative inner sample set is output in step S125, it is determined in step S126 whether or not the reliability metric is equal to or greater than 5.

If it is determined in step S126 that the reliability metric is less than 5 (NO in step S126), the sample set is rendered unsuitable for multiple regression analysis, and the process proceeds to step S127 where a constant α is added to the residual value. The constant α is a value suitably chosen so as to increase the residual value by not too large an amount. When step S127 is completed, the process returns to step S121, and the tentative inner sample set is determined once again, this time by using the residual value to which the constant α has been added. Then, the process from step S122 to step S125 is carried out using the thus determined tentative inner sample set, and the reliability metric is checked once again in step S126.

If YES in step S126, the process proceeds to step S128 to check the coefficient of determination R2. If the coefficient of determination R2 is 90 or higher (YES in step S128), the current tentative inner samples are determined as the inner samples in step S129, and the outer samples are then determined in step S130. Here, the outer samples are determined by removing the inner samples determined in step S129 from the whole sample set applied when starting the flow of FIG. 11.

If NO in step S128, that is, if the coefficient of determination R2 calculated by the multiple regression equation is less than 90, the process proceeds to step S131 where the residual value is reduced by α to further reduce the number of samples, after which the process from step S121 onward is repeated. The constant α in step S131 need not necessarily be the same as the constant α in step S127, and may be chosen suitably.

When the final inner sample set is determined in step S129 after going through the above procedure, the multiple regression equation generated in step S124 to determine that sample set is set as the prediction model for the current stage.

Figure 12:
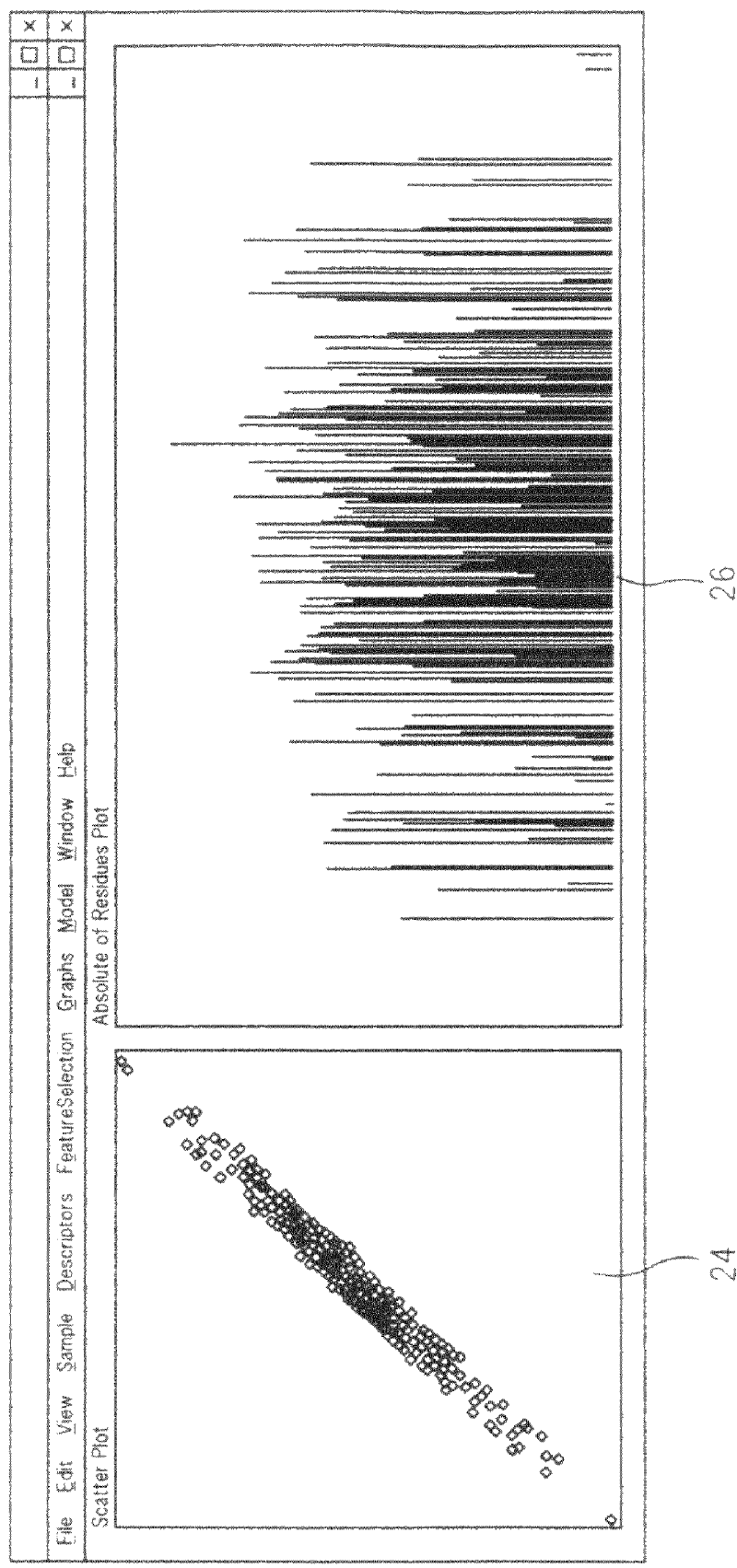
FIG. 12 is a graphical representation of the results of multiple regression analysis for the inner sample set determined in step S12 of FIG. 6.

FIG. 12 is diagram providing a graphical representation of the multiple regression information for the inner sample set determined in step S129, as in FIG. 9. In FIG. 12, reference numeral 24 indicates a graph plotting the calculated values of the objective variable against the measured values for the respective samples, and 26 indicates a graph plotting the residuals of the respective samples. In the graph 24, the abscissa represents the measured value of the objective variable, and the ordinate the calculated value of the objective variable. In the graph 26, the abscissa represents the sample ID, and the ordinate the residual. Samples having large residuals in the graph 22 of FIG. 8 are removed from the graph 26 of FIG. 12, and as a result, the inner samples cluster closer to the multiple regression line as depicted in graph 24, thus exhibiting higher correlation. Here, the ordinate of the graph 26 in FIG. 12 is not plotted to the same scale as the ordinate of the graph 22 in FIG. 9.

Figure 13:
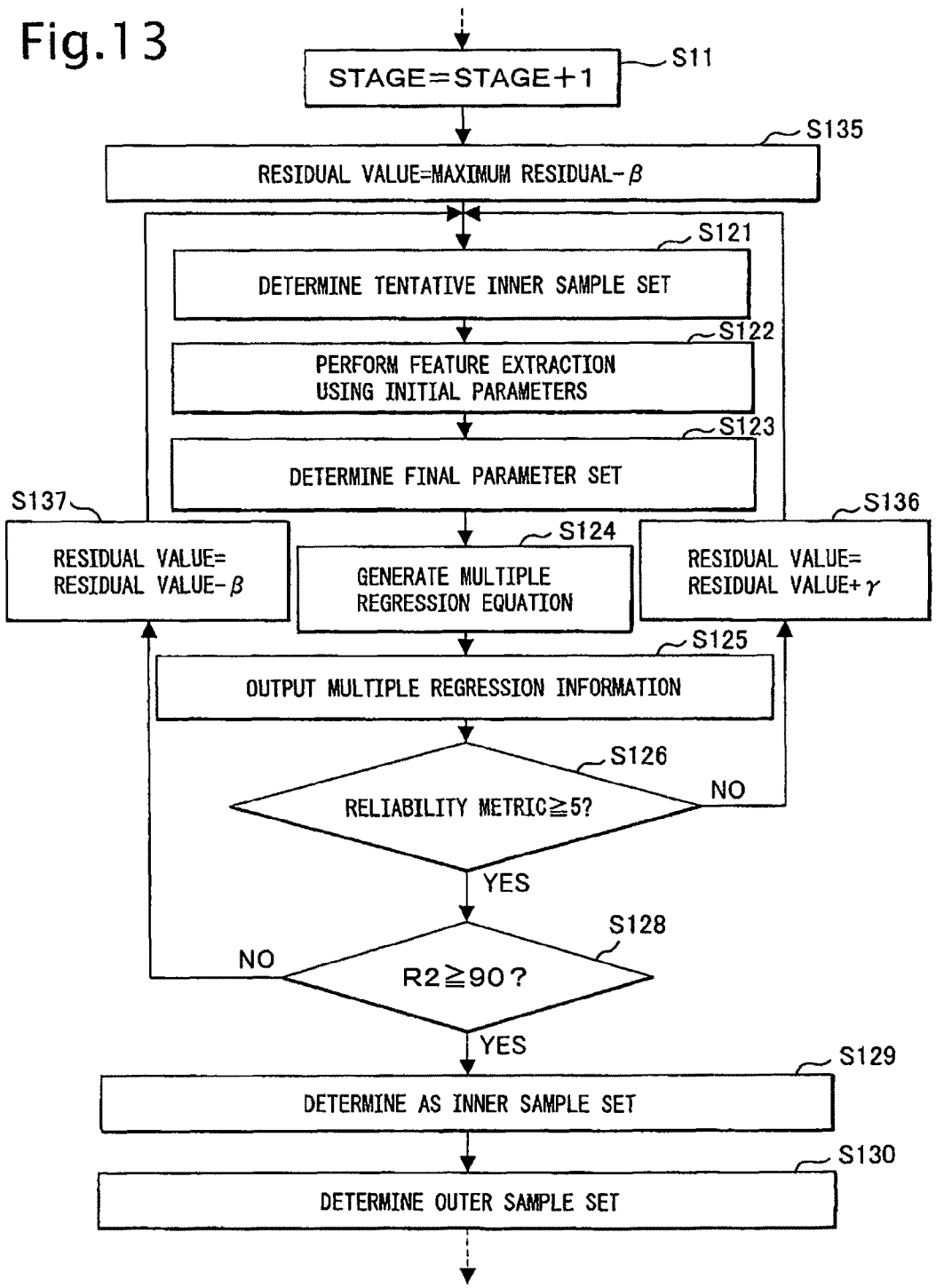
FIG. 13 is a flowchart depicting an alternative embodiment of step S12 of FIG. 6.

FIG. 13 is a diagram depicting an alternative embodiment of the inner-sample/outer-sample determining procedure illustrated in FIG. 11. In this embodiment, a value calculated by subtracting a constant β from the maximum residual is set as the residual value, and any sample whose residual is not larger than the thus set residual value is tentatively classified as an inner sample. In this case, if it is determined in step S126 that the reliability metric is less than 5 (NO in step S126), γ is added to the residual value, and the process from step S121 onward is repeated by using this new residual value. If it is determined in step S128 that the coefficient of determination R2 is less than 90 (NO in step S128), the residual value is further reduced by an amount equal to the constant β, and the process from step S121 onward is repeated by using this new residual value.

That is, in the embodiment depicted in FIG. 13, the inner sample set and the outer sample set are determined by gradually reducing the maximum residual value.

FIG. 14 is a data table depicting the multiple regression equation information for the inner samples and outer samples determined in various stages as described above. The table depicts that in STAGE 0, a value of 72.8 was obtained for the coefficient of determination R2 as a result of the multiple regression analysis applied to 779 samples using 28 parameters. It also depicts that 398 samples were classified as the inner samples in STAGE 1, and that a value of 96.2 was obtained for the coefficient of determination R2 as a result of the multiple regression analysis applied to these samples using 22 parameters. The coefficient of determination was 64.7 for the outer samples in STAGE 1.

In STATE 2, the analysis was performed by constructing a sample set using the outer samples determined in STAGE 1. In STAGE n, since the reliability metric of the outer sample set was less than 5, this sample set was not used for the construction of a new sample set, and no further multiple regression analysis was therefore performed. Accordingly, in STAGE n, only the multiple regression equation information for the inner samples was output, and the outer samples were classified as outlier samples, as in the commonly practiced multiple regression analysis; such samples will never be used again in the data analysis.

FIG. 15 depicts a table for storing the prediction model sets generated as described above. The multiple regression equation Yinn generated for the inner samples in each stage is stored as a prediction model for that stage. At the same time, the discriminant function Z used for the two-class classification of the inner samples and outer samples in each stage is also stored as a prediction model, as earlier described with reference to the flowchart of FIG. 6. In FIG. 15, $\alpha 11$ to $\alpha nn$ are coefficients for the respective parameters in the multiple regression equations Y, C(1) to C(n) are constants in the respective multiple regression equations Y, $\beta 11$ to $\beta nn$ are coefficients for the respective parameters in the two-class classifying discriminant functions Z, and K(1) to K(n) are constants in the respective discriminant functions Z.

Figure 16:
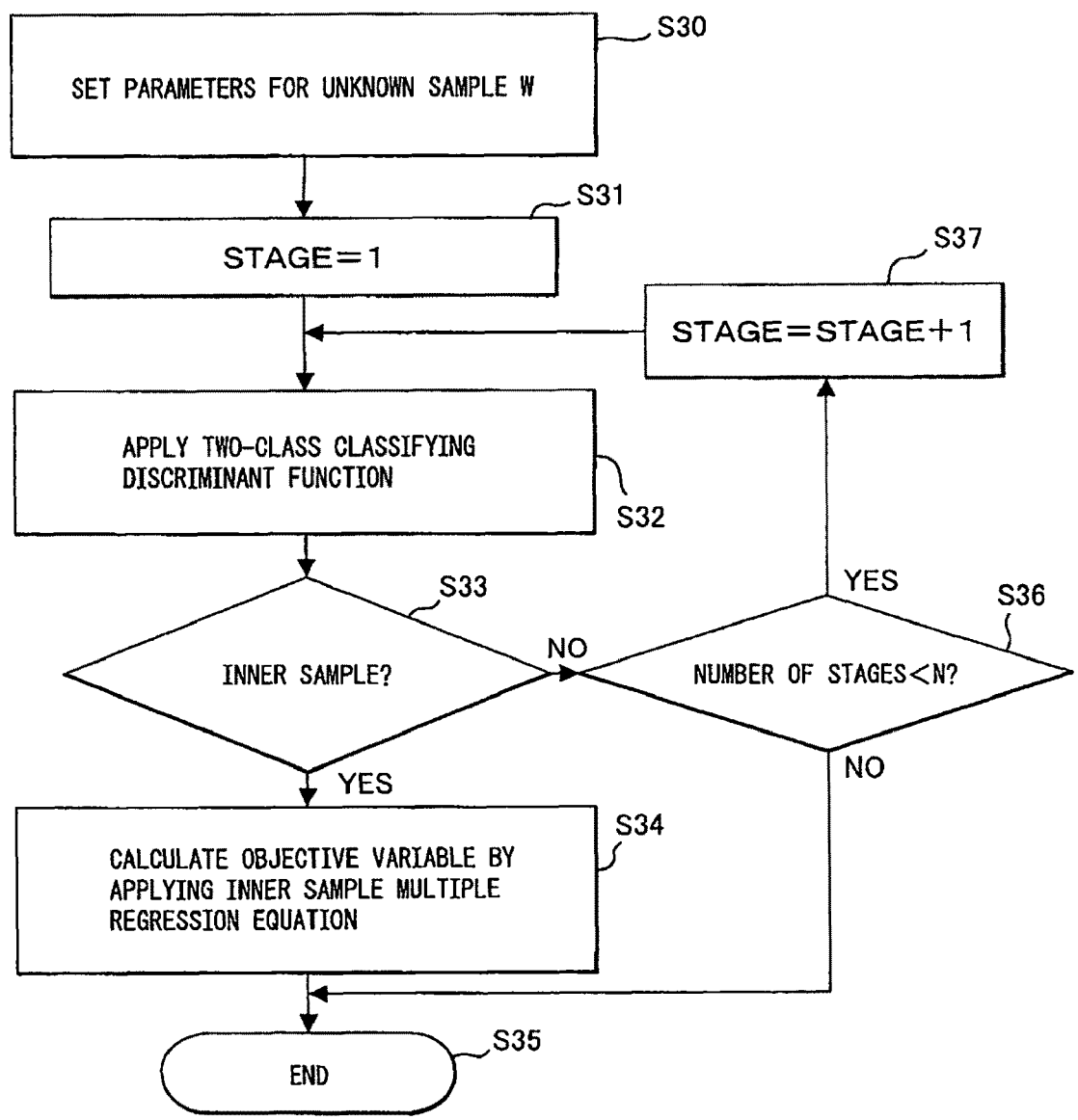
FIG. 16 is a flowchart illustrating how a prediction is made about a sample whose value of the objective variable is unknown, by using the prediction models generated by the method of the present invention.

FIG. 16 is a flowchart illustrating how a prediction is made about a sample whose value of the objective variable is unknown, by using the prediction models generated as described above. First, in step S30, parameters are set for a sample W whose objective variable is unknown. In step S31, STAGE is set to 1, and in step S32, the two-class classifying discriminant function stored as a prediction model for STAGE 1 is applied to the sample W. In step S33, it is determined whether the sample W belongs to the inner sample class or the outer sample class as a result of the application of the two-class classifying discriminant function.

If it is determined in step S33 that the sample W belongs to the inner sample class (YES in step S33), the process proceeds to step S34 where the multiple regression equation generated for the inner samples and stored as a prediction model for STAGE 1 is applied to the sample W to calculate the objective variable. The value calculated here is the final prediction value for the sample W, so that the prediction process is terminated in step S35. On the other hand, if it is determined in step S33 that the sample W belongs to the outer sample class (NO in step S33), then after checking in step S36 that the number of stages is less than the number N at which to terminate the process (YES in step S36) STAGE is advanced by 1 and the process from step S32 onward is carried out once again.

The loop consisting of steps S32, S33, S36, and S37 is iteratively performed until it is determined in step S33 that the sample W belongs to the inner sample class or until the number of stages reaches N in step S36. In this way, when the sample W is classified as belonging to the inner sample class in any one of stages, the objective variable is calculated in step S34 by applying the multiple regression equation generated for the inner samples for that STAGE, and the calculated value is determined as the final prediction value.

Thus, the objective variable of any unknown sample can be predicted with high reliability without losing information relating to the outer samples. While the above embodiment has described the generation of prediction models for the IC50, i.e., 50% inhibitory concentration, of chemicals, it will be appreciated that the present invention can also be carried out when the objective variable is 50% effective concentration (EC50) or 50% lethal concentration (LC50) or the like. Furthermore, effective predictions can also be made about the biodegradability and bioaccumulativeness of chemicals. In the above embodiment, the decision in step S803 (see FIG. 10A) or step S128 (see FIG. 11), for example, has been made by checking whether the value of the coefficient of determination 2R is not less than 90, but this value is not an absolute one. According to the experiment conducted by the inventor, it has been discovered that a prediction model having sufficiently high accuracy can be constructed even when the coefficient of determination 2R is about 80. Likewise, a prediction model having sufficiently high accuracy can be constructed even when the correlation coefficient R in step S805 (see FIG. 10B) is about 90.

[System Configuration]

Figure 17:
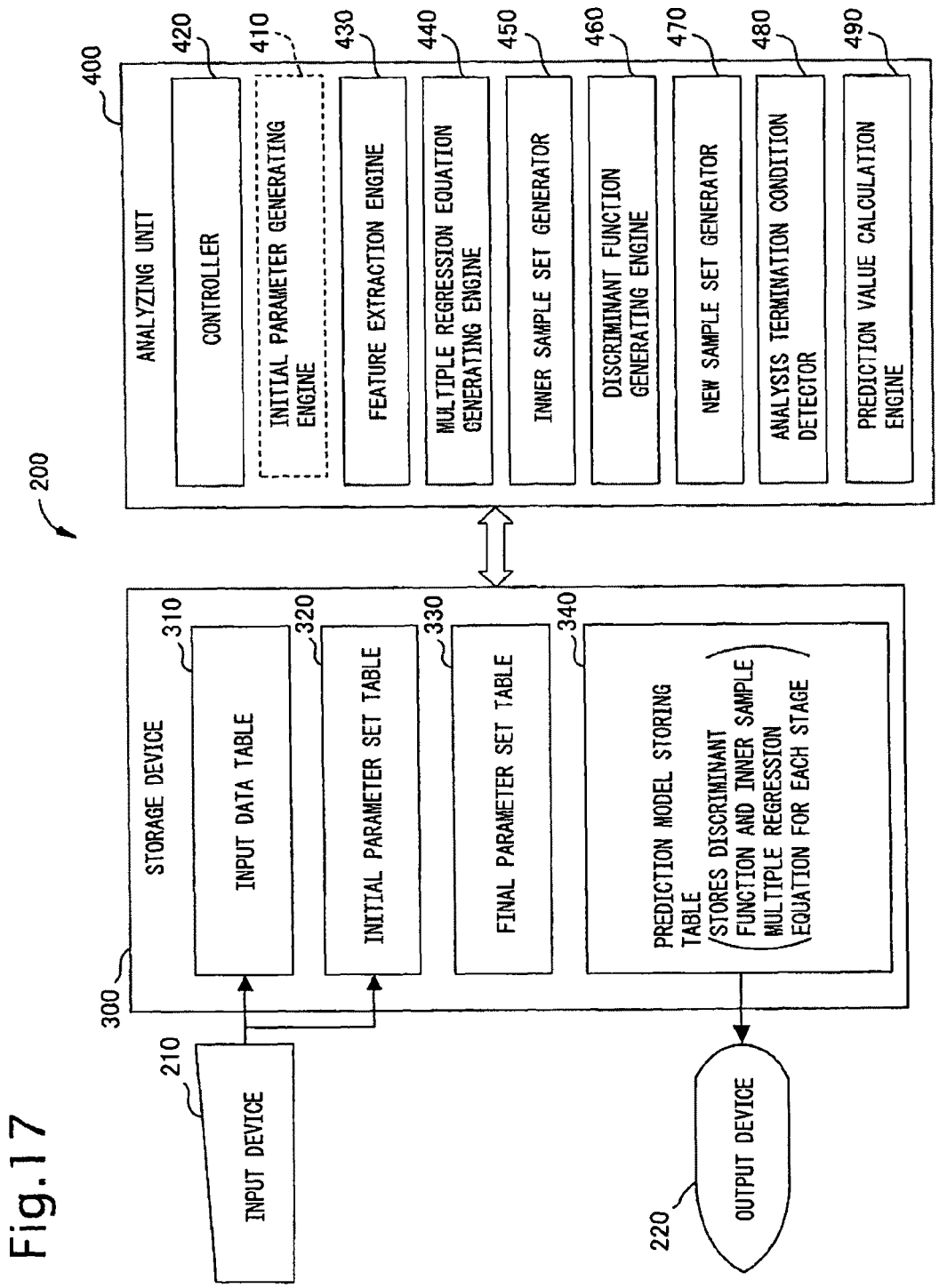
FIG. 17 is a block diagram depicting the configuration of a prediction model generation apparatus according to one embodiment of the present invention.

FIG. 17 is a block diagram depicting the system configuration of a prediction model generation apparatus according to one embodiment of the present invention. The apparatus depicted here includes the function of calculating a prediction value for a sample with an unknown objective variable by using a prediction model generated and stored within the apparatus. The prediction model generation apparatus 200 of this embodiment includes an input device 210 for entering sample data and an output device 220 for outputting a prediction model or the data that the user needs during processing. Sample information necessary for generating a prediction model based on multiple regression analysis is entered from the input device 210 into an input data table 310 in a storage device 300. Likewise, initial parameter set data is entered from the input device 210 into an initial parameter set table 320. If an analyzing unit 400 has an engine 410 for automatically generating the initial parameters for input samples, there is no need to enter the initial parameter set data from the input device 210.

In FIG. 17, reference numeral 330 is a table for storing the final parameter set obtained by performing feature extraction on the initial parameter set. Reference numeral 340 is a table for storing each prediction model generated as a result of the analysis; more specifically, it stores the discriminant function for the two-class classification of the inner samples and outer samples determined in each stage, and the multiple regression equation generated for the inner sample set determined in each stage.

The analyzing unit 400 includes a controller 420, an initial parameter generating engine 410, a feature extraction engine 430, a multiple regression equation generating engine 440, an inner sample set generator 450, a two-class classifying discriminant function generating engine 460, a new sample set generator 470, and an analysis termination condition detector 480. If provisions are made to generate the initial parameters outside the apparatus, the initial parameter generating engine 410 is not needed. The initial parameter generating engine 410 and the feature extraction engine 430 can be implemented using known ones.

The feature extraction engine 430 determines the final parameter set by performing feature extraction on the initial parameter set, and stores it in the final parameter set table 330. The multiple regression equation generating engine 440 is equipped with various known multiple regression equation generating programs and, using the multiple regression equation generating program specified by the user or suitably selected by the system, generates the initial multiple regression equation by applying multiple regression analysis to the input sample while referring to the final parameter set table 330. The inner sample set generator 450 determines the inner sample set based on the result yielded by the thus generated initial multiple regression equation. This determination is made based on the residual value of each sample and the value of the coefficient of determination. Once the inner sample set is determined, the outer sample set is also determined.

The discriminant function generating engine 460 is equipped with various known discriminant function generating programs and, using the discriminant function generating program specified by the user or suitably selected by the system, generates the discriminant function for classifying the inner samples and outer samples by performing two-class classification on the inner sample set and the outer sample set. The new sample set generator 470 generates the sample set for the next stage by using the outer sample set determined by the inner sample set generator 450.

The initial parameter generating engine 410, the feature extraction engine 430, the multiple regression equation generating engine 440, the inner sample set generator 450, the discriminant function generating engine 460, the new sample set generator 470, and the analysis termination condition detector 480 each operate under the control of the controller 420 to carry out the process depicted in FIGS. 6 and 11 (or 13). The analysis termination condition detector 480 carries out the process depicted in FIG. 10A or 10B. The analysis termination condition may be preset by the system or may be suitably set by the user via the input device 210.

For each unknown sample entered from the input device 210, a prediction value calculation engine 490 calculates the value (prediction value) of the objective variable of that sample by referring to the discriminant function and multiple regression equation stored in the prediction model storing table 340 and the data stored in the final parameter set table 330.

The two-class classification discriminant function for the inner sample and outer sample sets in each stage, the multiple regression equation for the inner sample set, and the prediction result obtained by the analyzing unit 400 are stored in the prediction model storing table 340 in the storage device 300 or output via the output device 220. The output device can be selected from among various kinds of storage devices, a display, a printer, etc., and the output format can be suitably selected from among various kinds of files (for example, USB file), display, printout, etc.

Each of the above programs can be stored on a computer-readable recording medium, and such recording media can be distributed and circulated for use. Further, each of the above programs can be distributed and circulated through communication networks such as the Internet. The computer-readable recording media include magnetic recording devices, optical disks, magneto-optical disks, or semiconductor memories (such as RAM and ROM). Examples of magnetic recording devices include hard disk drives (HDDs), flexible disks (FDs), magnetic tapes (MTs), etc. Examples of optical disks include DVDs (Digital Versatile Discs), DVD-RAMs, CD-ROMs, CR-RWs, etc. Example of magneto-optical disks include MOs (Magneto-Optical discs).

The present invention is applicable to any industrial field to which multiple regression analysis can be applied. Main application fields are listed below.
1) Chemical data analysis
2) Biotechnology-related research
3) Protein-related research
4) Medical-related research
5) Food-related research
6) Economy-related research
7) Engineering-related research
8) Data analysis aimed at improving production yields, etc.
9) Environment-related research In the field of chemical data analysis 1), the invention can be applied more particularly to the following researches.
(1) Structure-activity/ADME/toxicity/property relationships research
(2) Structure-spectrum relationships research
(3) Metabonomics-related research
(4) Chemometrics research For example, in the field of structure-toxicity relationships research, it is extremely important to predict the results of tests, such as 50% inhibitory concentration (IC50) tests, 50% effective concentration (EC50) tests, 50% lethal concentration (LC50) tests, degradability tests, accumulative tests, and 28-day repeated dose toxicity tests on chemicals. The reason is that these tests are incorporated among the most important items into national-level chemical regulations such as industrial safety and health law and chemical examination law related to toxic chemicals regulations. Any chemical to be marketed is required to pass such concentration tests; otherwise, the chemical could not be manufactured in Japan, and the manufacturing activities of chemical companies would halt. Manufacturing overseas and exports of such chemicals are banned by safety regulations in the countries concerned. For example, according to the REACH regulation adopted by the EU Parliament, any company using a chemical is obliged to predict and evaluate the concentration test result of that chemical. Accordingly, the method, apparatus, and program of the present invention that can predict such concentrations with high prediction accuracy provide effective tools in implementing the REACH regulation.

What is claimed is:

1. A method for generating a prediction model based on multiple regression analysis using a computer, comprising:
   constructing an initial sample set from samples for each of which a measured value of an objective variable is known;
   obtaining a calculated value of said objective variable by applying multiple regression analysis to said initial sample set;
   extracting samples whose difference between said measured value and said calculated value is not larger than a first value, and calculating a correlation coefficient or a coefficient of determination by applying multiple regression analysis to a sub-sample set constructed from said extracted samples;
   repeating said extracting by changing said first value until said correlation coefficient or said coefficient of determination exceeds a second value;
   performing two-class classification to classify said sub-sample set obtained at the end of said repeating as a first sub-sample set and remaining samples as a second sub-sample set, and calculating a class classifying discriminant function;
   constructing a prediction model from a multiple regression equation obtained through said multiple regression analysis at the end of said repeating and from said discriminant function calculated in said performing; and
   replacing said initial sample set by said second sub-sample set, and repeating processing from said obtaining to said constructing, thereby obtaining a plurality of prediction models.

2. The method as claimed in claim 1, wherein said replacing stops repeating said processing when the ratio of the number of samples contained in said sub-sample set to the number of parameters used in said multiple regression analysis has decreased below a predetermined value.

3. The method as claimed in claim 1, wherein said replacing stops repeating said processing when the number of said repetitions has reached a predetermined number.

4. The method as claimed in claim 1, wherein said second value used in said repeating as a criterion for evaluating said coefficient of determination is 80 or larger with said coefficient of determination equal to 1 being expressed as 100.

5. A computer readable medium having a program recorded thereon, said program generates a prediction model based on multiple regression analysis by causing a computer to execute:
   constructing an initial sample set from samples for each of which a measured value of an objective variable is known;
   obtaining a calculated value of said objective variable by applying multiple regression analysis to said initial sample set;
   extracting samples whose difference between said measured value and said calculated value is not larger than a first value, and calculating a correlation coefficient or a coefficient of determination by applying multiple regression analysis to a sub-sample set constructed from said extracted samples;
   repeating said extracting by changing said first value until said correlation coefficient or said coefficient of determination exceeds a second value;
   performing two-class classification to classify said sub-sample set obtained at the end of said repeating as a first sub-sample set and remaining samples as a second sub-sample set, and calculating a class classifying discriminant function;
   constructing a prediction model from a multiple regression equation obtained through said multiple regression analysis at the end of said repeating and from said discriminant function calculated in said performing; and
   replacing said initial sample set by said second sub-sample set, and repeating processing from said obtaining to said constructing, thereby obtaining a plurality of prediction models.

6. The computer readable medium as claimed in claim 5, wherein said replacing stops repeating said processing when the ratio of the number of samples contained in said sub-sample set to the number of parameters used in said multiple regression analysis has decreased below a predetermined value.

7. The computer readable medium as claimed in claim 5, wherein said replacing stops repeating said processing when the number of said repetitions has reached a predetermined number.

8. The computer readable medium as claimed in claim 5, wherein said second value used in said repeating as a criterion for evaluating said coefficient of determination is 80 or larger with said coefficient of determination equal to 1 being expressed as 100.

9. A method for generating a chemical toxicity prediction model based on multiple regression analysis using a computer, comprising:
taking a given toxicity of a chemical as an objective variable, and constructing an initial sample set from chemicals for each of which a measured value of said objective variable is known;
obtaining a calculated value of said objective variable by applying multiple regression analysis to said initial sample set;
extracting chemicals whose difference between said measured value and said calculated value is not larger than a first value, and calculating a correlation coefficient or a coefficient of determination by applying multiple regression analysis to a sub-sample set constructed from said extracted samples;
repeating said extracting by changing said first value until said correlation coefficient or said coefficient of determination exceeds a second value;
performing two-class classification to classify said sub-sample set obtained at the end of said repeating as a first sub-sample set and remaining samples as a second sub-sample set, and calculating a class classifying discriminant function;
constructing a prediction model from a multiple regression equation obtained through said multiple regression analysis at the end of said repeating and from said discriminant function calculated in said performing; and
replacing said initial sample set by said second sub-sample set, and repeating processing from said obtaining to said constructing, thereby obtaining a plurality of prediction models.

10. The method as claimed in claim 9, wherein said given toxicity is selected from the group consisting of biodegradability, bioaccumulativeness, 50% inhibitory concentration, 50% effective concentration, and 50% lethal concentration of said chemical.

11. An apparatus for generating a prediction model based on multiple regression analysis, comprising:
a first unit which constructs an initial sample set from samples for each of which a measured value of an objective variable is known;
a second unit which obtains a calculated value of said objective variable by applying multiple regression analysis to said initial sample set;
a third unit which extracts samples whose difference between said measured value and said calculated value is not larger than a first value, and calculates a correlation coefficient or a coefficient of determination by applying multiple regression analysis to a sub-sample set constructed from said extracted samples;
a fourth unit which causes said third unit to continue processing by changing said first value until said correlation coefficient or said coefficient of determination exceeds a second value;
a fifth unit which performs two-class classification to classify said sub-sample set obtained at the end of processing by said fourth unit as a first sub-sample set and remaining samples as a second sub-sample set, and calculates a class classifying discriminant function;
a sixth unit which constructs a prediction model from a multiple regression equation obtained through said multiple regression analysis at the end of processing by said fourth unit and from said discriminant function calculated by said fifth unit; and
a seventh unit which causes the processing by said second, third, fourth, fifth, and sixth units to be executed repeatedly by replacing said initial sample set by said second sub-sample set.

12. The apparatus as claimed in claim 11, wherein said seventh unit stops repeating said processing when the ratio of the number of samples contained in said sub-sample set to the number of parameters used in said multiple regression analysis has decreased below a predetermined value.

13. The apparatus as claimed in claim 11, wherein said seventh unit stops repeating said processing when the number of said repetitions has reached a predetermined number.

14. The apparatus as claimed in claim 11, wherein said second value used in said fourth unit as a criterion for evaluating said coefficient of determination is 80 or larger with said coefficient of determination equal to 1 being expressed as 100.

15. A method for predicting, using a computer, an objective variable of a sample whose objective variable is unknown, comprising:
generating a plurality of prediction models each constructed from a multiple regression equation and a two-class classifying discriminant function, wherein said plurality of prediction models are generated by executing:
constructing an initial sample set from samples for each of which a measured value of said objective variable is known;
obtaining a calculated value of said objective variable by applying multiple regression analysis to said initial sample set,
extracting samples whose difference between said measured value and said calculated value is not larger than a first value, and calculating a correlation coefficient or a coefficient of determination by applying multiple regression analysis to a sub-sample set constructed from said extracted samples,
repeating said extracting by changing said first value until said correlation coefficient or said coefficient of determination exceeds a second value,
performing two-class classification to classify said sub-sample set obtained at the end of said repeating as a first sub-sample set and remaining samples as a second sub-sample set, and calculating a class classifying discriminant function,
constructing a prediction model from a multiple regression equation obtained through said multiple regression analysis at the end of said repeating and from said discriminant function calculated in said performing, and
replacing said initial sample set by said second sub-sample set, and repeating processing from said obtaining to said constructing, thereby obtaining said plurality of prediction models;
sequentially applying said discriminant functions in said plurality of prediction models, in the order in which said prediction models were generated, to a sample whose objective variable is unknown until said sample is judged to belong to said first sub-sample set; and
calculating said objective variable of said unknown sample by applying to said unknown sample the multiple regression equation belonging to the same prediction model as the discriminant function used to judge said unknown sample to belong to said first sub-sample set.

16. A method for generating a prediction model based on multiple regression analysis, comprising:

constructing an initial sample set from samples for each of which a measured value of an objective variable is known;

obtaining a calculated value of said objective variable by applying multiple regression analysis to said initial sample set;

extracting samples whose difference between said measured value and said calculated value is not larger than a first value, and calculating a correlation coefficient or a coefficient of determination by applying multiple regression analysis to a sub-sample set constructed from said extracted samples;

repeating said extracting by changing said first value until said correlation coefficient or said coefficient of determination exceeds a second value;

performing two-class classification to classify said sub-sample set obtained at the end of said repeating as a first sub-sample set and remaining samples as a second sub-sample set, and calculating a class classifying discriminant function;

constructing a prediction model from a multiple regression equation obtained through said multiple regression analysis at the end of said repeating and from said discriminant function calculated in said performing; and replacing said initial sample set by said second sub-sample set, and repeating processing from said obtaining to said constructing, thereby obtaining a plurality of prediction models.

* * * * *